United States Patent
Schwartz et al.

(10) Patent No.: US 9,973,875 B2
(45) Date of Patent: May 15, 2018

(54) COMPUTER BASED METHOD AND SYSTEM FOR LOGGING IN A USER MOBILE DEVICE AT A SERVER COMPUTER SYSTEM

(71) Applicants: Evan Schwartz, Brooklyn, NY (US); Lasse Hamre, New York, NY (US); Michael Moss, San Antonio, TX (US); Dan MacTiernan, New York, NY (US)

(72) Inventors: Evan Schwartz, Brooklyn, NY (US); Lasse Hamre, New York, NY (US); Michael Moss, San Antonio, TX (US); Dan MacTiernan, New York, NY (US)

(73) Assignee: IHEARTMEDIA MANAGEMENT SERVICES, INC., San Antonio, TX (US)

(*) Notice: Subject to any disclaimer, the term of this patent is extended or adjusted under 35 U.S.C. 154(b) by 558 days.

(21) Appl. No.: 13/746,400

(22) Filed: Jan. 22, 2013

(65) Prior Publication Data
US 2013/0130662 A1 May 23, 2013

Related U.S. Application Data

(63) Continuation-in-part of application No. 12/234,488, filed on Sep. 19, 2008, now Pat. No. 8,359,031.

(51) Int. Cl.
*G06F 15/16* (2006.01)
*H04W 4/00* (2018.01)
(Continued)

(52) U.S. Cl.
CPC ............... *H04W 4/00* (2013.01); *H04W 4/12* (2013.01); *H04L 29/12783* (2013.01);
(Continued)

(58) Field of Classification Search
CPC .......... H04N 7/17318; H04N 21/4826; H04N 21/4668; H04L 29/0809; H04L 12/5895;
(Continued)

(56) References Cited

U.S. PATENT DOCUMENTS 6,968,385 B1 * 11/2005 Gilbert ................ G06F 21/6218
709/229
8,364,504 B1 * 1/2013 Bleser et al. ..................... 705/3
(Continued)

OTHER PUBLICATIONS

Metz, Rachel. 'We Don't Need No Stinkin' Login'. Jul. 20, 2004 [retrieved on Aug. 4, 2015]. Retrieved from the Internet <URL: http://archive.wired.com/techbiz/it/news/2004/07/64270?currentPage=all>.*
(Continued)

*Primary Examiner* — Kevin Bates
*Assistant Examiner* — Dae Kim
(74) *Attorney, Agent, or Firm* — Garlick & Markison; Edward J. Marshall

(57) ABSTRACT

The invention provides a computer-based method for logging a user mobile device onto a server computer system including registering a unique identifier of a user mobile device, receiving a first message from the user mobile device, detecting an Internet Protocol address associated with the user mobile device, receiving the unique identifier corresponding to the Internet Protocol address; and transmitting to the user mobile device a second message.

20 Claims, 20 Drawing Sheets

(51) Int. Cl.
  *H04W 4/12* (2009.01)
  *H04L 12/58* (2006.01)
  *H04L 29/12* (2006.01)
  *H04L 29/08* (2006.01)
  *H04M 3/42* (2006.01)

(52) U.S. Cl.
  CPC .............. *H04L 51/38* (2013.01); *H04L 61/35* (2013.01); *H04L 67/06* (2013.01); *H04L 67/34* (2013.01); *H04M 3/42017* (2013.01)

(58) Field of Classification Search
  CPC ... H04L 51/38; H04L 63/08; H04L 29/12783; H04L 61/35; H04W 4/14; H04W 12/06
  See application file for complete search history.

(56) References Cited

U.S. PATENT DOCUMENTS

| | | | |
|---|---|---|---|
| 2001/0028636 | A1 | 10/2001 | Skog et al. |
| 2002/0015403 | A1 | 2/2002 | McConnell et al. |
| 2002/0078177 | A1* | 6/2002 | Dutta ................ G06F 17/30899 709/219 |
| 2003/0035409 | A1 | 2/2003 | Wang et al. |
| 2003/0050918 | A1 | 3/2003 | Pilkington et al. |
| 2003/0078926 | A1* | 4/2003 | Uthe ................ G06F 17/30861 |
| 2003/0186682 | A1 | 10/2003 | Aschir |
| 2005/0144251 | A1 | 6/2005 | Slate |
| 2006/0043164 | A1* | 3/2006 | Dowling et al. ............... 235/375 |
| 2007/0140470 | A1 | 6/2007 | Malik |
| 2007/0186006 | A1* | 8/2007 | Murray ......................... 709/231 |
| 2007/0218446 | A1* | 9/2007 | Smith ..................... G09B 5/00 434/350 |
| 2007/0271149 | A1* | 11/2007 | Siegel ................ G06Q 30/0603 705/26.41 |
| 2008/0065474 | A1* | 3/2008 | Sharma ................. G06Q 30/02 705/12 |
| 2008/0134018 | A1* | 6/2008 | Kembel ............ G06F 17/30899 715/234 |
| 2008/0172496 | A1* | 7/2008 | Middleton ............ G06Q 30/02 709/246 |
| 2008/0195664 | A1* | 8/2008 | Maharajh .......... G06F 17/30035 |
| 2008/0307454 | A1* | 12/2008 | Ahanger ................ G06Q 30/02 725/36 |
| 2009/0029685 | A1* | 1/2009 | Willis ..................... H04L 67/04 455/414.1 |
| 2009/0061764 | A1* | 3/2009 | Lockhart ........... G06F 17/30017 455/3.06 |
| 2009/0077470 | A1* | 3/2009 | Mehta et al. ................. 715/738 |
| 2009/0106835 | A1* | 4/2009 | Corrao .................... H04L 63/10 726/21 |
| 2009/0234876 | A1* | 9/2009 | Schigel ............. G06F 17/30873 |
| 2010/0042688 | A1 | 2/2010 | Maghraby |
| 2010/0057832 | A1* | 3/2010 | Tsun ...................... G06Q 30/02 709/203 |
| 2010/0107214 | A1* | 4/2010 | Ganz ............................... 726/1 |
| 2011/0035434 | A1 | 2/2011 | Lookwood |
| 2012/0278722 | A1* | 11/2012 | Raleigh .................. H04L 12/14 715/735 |
| 2013/0246630 | A1* | 9/2013 | Exton .................... H04L 67/02 709/227 |

OTHER PUBLICATIONS

"Need php/mysql music script". SitePoint Forums, Jul. 1, 2004 [retrieved on Sep. 27, 2016]. Retrieved from the Internet <URL: http://www.sitepoint.com/forums/showthread.php?178665-Need-php-mysql-music-script>.*

"Find and play music from the web, mixturtle.com". Thenextweb, Jul. 29, 2008 [retrieved on Sep. 27, 2016]. Retrieved from the Internet <URL: http://thenextweb.com/music/2008/07/29/find-and-play-music-from-the-web-mixturtlecom/>.*

Pogue, David. "For iPhone, the 'New' Is Relative". The New York Times, Jul. 9, 2008 [retrieved on Sep. 24, 2016]. Retrieved from the Internet <URL: http://www.nytimes.com/2008/07/09/technology/personaltech/09pogue.html?_r=0>.*

Karp, Scott. "What is the ROI of Requiring User Registration to Access Online Content?". Dec. 27, 2007 [retrieved on Sep. 21, 2016]. Retrieved from the Internet <URL: http://publishing2.com/2007/12/27/what-is-the-roi-of-requiring-user-registration-to-access-online-content/>.*

Ellison, Jonah. 'Authenticated User Page caching (Authcache)'. Drupal.org, Mar. 8, 2009 [retrieved on Apr. 15, 2017]. Retrieved from the Internet <URL:https://www.drupal.org/project/authcache>.*

* cited by examiner

| Supported Interactions with Functionality | Threshold | Platform Web | Mobile | Message ID - Web | Message ID - Mobile |
|---|---|---|---|---|---|
| Anonymous and Registered Users | | | | | |
| Create Custom Radio Station | 3 | X | X | 1. Create-Web | 9. Create-Mobile |
| Play Custom Song | 5 | X | X | 2. Continue-Web | 10. Continue-Mobile |
| Custom Radio Station Votes and Skips | 10 | X | | 3. Custom-Vote-Web | 11. Custom-Vote-Mobile |
| Live Radio Votes | | | | 4. Live-Vote-Web | 12. Live-Vote-Mobile |
| Registered Users Only | | | | | |
| Save Station | 0 | X | X | 5. Save-Vote-Web | 13. Save-Vote-Mobile |
| My Profile / My Stations | 0 | X | | 6. User-Profile-Web | |
| Friends | 0 | X | | 7. User-Profile-Web | |
| Publish on Social Network Timeline | 0 | X | X | 8. FB-Publish-Web | 14. FB-Publish-Mobile |

FIG. 15A

COMPUTER BASED METHOD AND SYSTEM FOR LOGGING IN A USER MOBILE DEVICE AT A SERVER COMPUTER SYSTEM

CROSS-REFERENCE TO RELATED APPLICATIONS

The present U.S. Utility Patent Application claims priority pursuant to 35 U.S.C. § 120, as a continuation-in-part (CIP), to the following U.S. Utility Patent Application which is hereby incorporated herein by reference in its entirety and made part of the present U.S. Utility Patent Application for all purposes:

U.S. Utility application Ser. No. 12/234,488, entitled "A COMPUTER BASED METHOD AND SYSTEM FOR LOGGING IN A USER MOBILE DEVICE AT A SERVER COMPUTER SYSTEM," filed Sep. 19, 2008, pending.

BACKGROUND OF THE INVENTION

1). Field of the Invention

This invention relates to a computer-based method and system for manipulating electronic media such as ringtones and videos.

2). Discussion of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the Internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

BRIEF DESCRIPTION OF THE DRAWINGS

The invention is further described by way of example with reference to the accompanying drawings, wherein:

FIG. 15A is a diagram illustrating various interactions with functionalities supported by the disclosure;

DETAILED DESCRIPTION OF THE INVENTION

1. Network Overview

Figure 1:
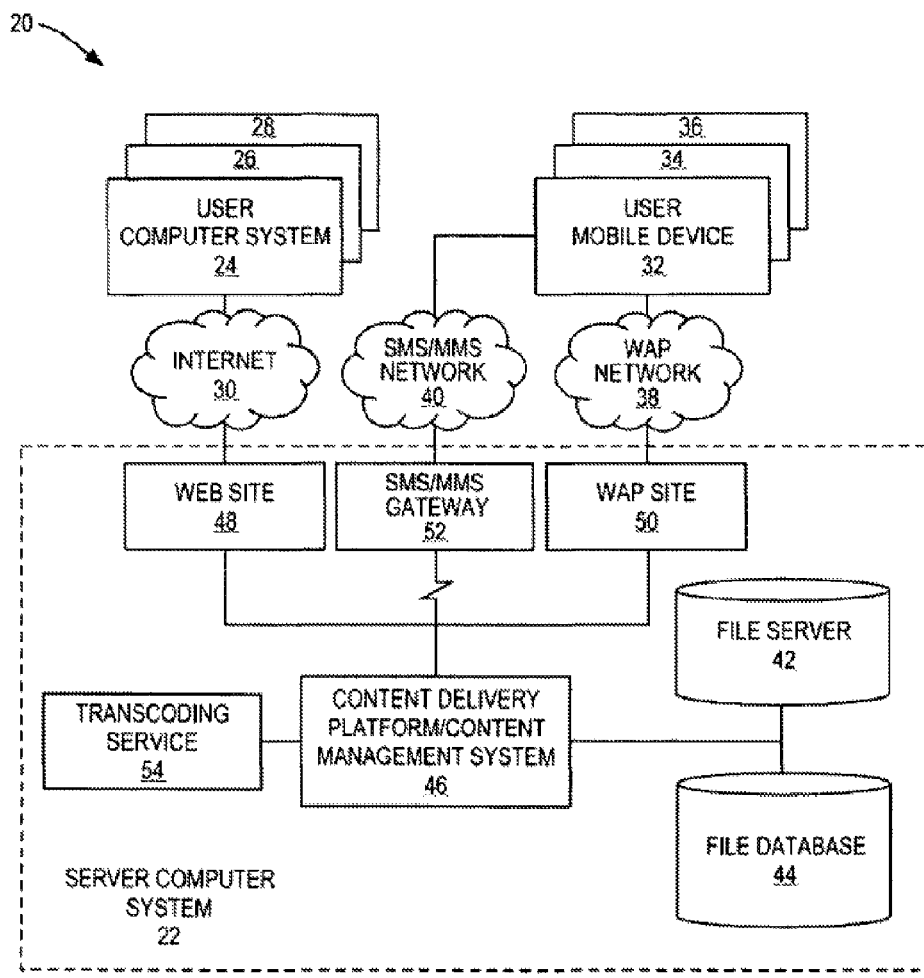
FIG. 1 is a block diagram of a network system in which aspects of the invention are manifested.

FIG. 1 of the accompanying drawings illustrates a network system 20 that embodies features of the invention. The network system 20 includes a server computer system 22, a plurality of user computer systems 24, 26, and 28 that are connected to the server computer system 22 over a network in the form of the Internet 30, and a plurality of user mobile devices 32, 34, and 36 that are connected over a Wireless Application Protocol (WAP) network 38 and over a Short Message Service (SMS) and Multimedia Messaging Service (MMS) network 40 to the server computer system 22.

The server computer system 22 includes a file store in the form of a file server 42, a data store in the form of a file database 44, a content delivery platform and content management system 46, a Web site 48, a WAP site 50, an SMS/MMS gateway 52, and a transcoding service 54. The file database 44 is connected to the file server 42. The content delivery platform and content management system 46 forms the center of the server computer system 22, and all other components including the Web site 48, WAP site 50, SMS/MMS gateway 52, transcoding service 54, file server 42, and file database 44 are directly connected to the content delivery platform and content management system 46. The content delivery platform and content management system 46 indexes files such as ringtones (reduced media content), full-track content, games, wallpaper, and graphics from the file server 42 into the file database 44 and in a structured manner, as will be required for downloading and for the Web site 48, WAP 50, SMS/MMS gateway 52, and transcoding service 54. In some embodiments, the content delivery platform and content management system 46 manages delivery of, and access to, various content from various content sources. Content sources can include the server computer system 22, computer systems, additional separate server computer systems, mobile devices, and the like coupled to the server computer system 22 over a network, such as the Internet 30. Content can include streaming content such as one or more playlists of streaming media files, data associated with the playlists stored in one or more locations. For example, content delivery platform and content management system 46, in some embodiments, manages delivery of streaming content from a radio station, to which the server computer system is coupled over the Internet 30, to various user computer systems 24, 26, and 28 and user mobile devices 32, 34, and 36, through one or more web sites 48, SMS/MMS gateways 52, and WAP sites 50. In some embodiments, the content delivery platform and content management system 46 manages data associated with users, including user interactions with various content, user-created custom radio stations for accessing certain content, and the like. User interactions can include, without limitation accessing certain content, providing certain actions with regard to certain content, and specifying preferences and parameters that are used to create custom collections, playlists, and the like. Actions with regard to certain content can include providing feedback regarding certain content, including, without limitation, a rating and a vote regarding a certain media file provided to the user, Custom collections and playlists of content can include custom radio stations that can provide streaming and stored content from one or more various content sources, where the content provided is determined based on one or more of preferences and parameters specified by the user. User-created custom radio stations can be used to provide content to a user from a remote content source, such as a radio station, and content stored in the file server 42 based on preferences, parameters, and the like specified by the user. Data associated with custom stations, including one or more of user-specified station preferences and parameters, can be stored in one or more of the user computer systems 24, 26, and 28; user mobile devices 32, 34, and 36; and file database 44. In some embodiments, data associated with a custom station created by a particular user can be indexed with data associated with the particular user in file database 44. The transcoding service 54 prepares communications suitable for transmission over the Internet 30, WAP network 38, and SMS/MMS network 40.

2. Web Site

Figure 2:
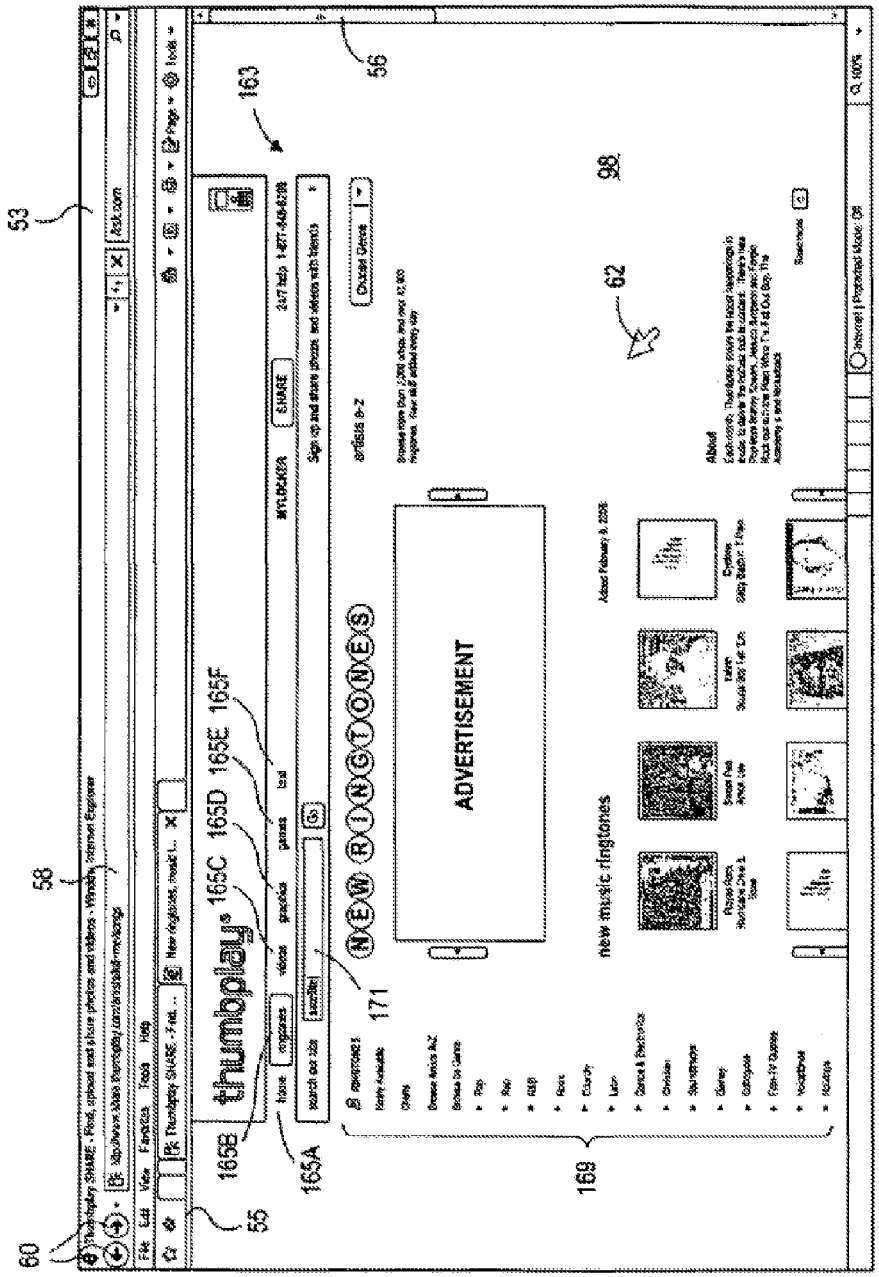
FIG. 2 is a screenshot of a browser view that displays a view of a website.

FIG. 2 illustrates a home page 163 within a browser view 53 at the user computer system 24, 26, or 28 in FIG. 1. The browser view 53 forms part of an Internet browser application such as Internet Explorer®, Netscape®, or Firefox®. The browser view 53 includes a viewing pane 55 within which the home page 163 is displayed. The browser view 53 also includes a vertical scroll bar 56 that can be moved up or down to view portions of the home page 163 if the entire home page 163 does not fit vertically within the viewing pane 55. The browser view 53 also has an address box 58 and back and forward buttons 60. A user can use a mouse to move a cursor 62 into the address box 58, and then depress a button on the mouse to select the address box 58. The user can then utilize a keyboard to enter text such as "thumbplay.com" in the address box 58, and can then depress an "enter" key on the keyboard to transmit a signal and a request for a page. The text within the address box 58 can also be automatically updated, for example when a user logs into the home page 163. The back and forward buttons 60 can be used to view earlier or subsequent pages. In some embodiments, the user interacts with various features provided by the home page 163 to access various content associated with the server computer system 22 illustrated in FIG. 1. For example, a user can interact with various features provided by the home page 163 to receive streaming content from a radio station and create a customized radio station that streams selected content from the radio station based on preferences provided by the user. In some embodiments, the user interacts with various features provided by the home page 163 to specify one or more of preferences and parameters regarding the various features. In some embodiments, the user interacts with various features provided by the home page 163 to provide feedback regarding various content including, without limitation, ratings and votes regarding the content, the content source, and the like.

The home page 163 is in a general area of the Web site 48 in FIG. 1. The home page 163 includes tabs 165A to 165F that provide links to other pages of the general area. In some embodiments, the homepage provides access to various content, including streaming content and ringtones. In the home page 163, the tab 165B is highlighted, indicating that the home page 163 is in a portion of the general area relating to ringtones.

The home page 163 is typically displayed at one of the user computer systems 24, 26, or 28 in FIG. 1, and provides the user computer systems 24, 26, or 28 access to content, including streaming content and ringtones, through a browse menu 169 or by entering text in a search box 171. Text can, for example, be entered in the search box 171, and an acquiring user can then either select a "go" button, or hit "enter" on a keyboard to cause transmission of a signal from the user computer systems 24, 26, or 28 over the internet 30 to the Web site 48 in FIG. 1. The signal includes an address for the Web site 48, a query that is entered in the search box 171, and a return address for the user computer systems 24, 26, or 28. The query is used at the Web site 48 to extract one or more search results. A signal is then transmitted from the Web site 48 over the internet 30 to the user computer systems 24, 26, or 28, the signal including the search result or search results and an address corresponding to the return address received from the user computer 24, 26, or 28.

Not every signal is described in detail herein. One skilled in the art will appreciate that a signal is generated by and transmitted from one computer system and received and processed at another computer system, and will also appreciate what the contents of such a signal will be. One skilled in the art will also appreciate that a computerized step is typically carried out by a respective module of software code stored in memory of a computer. For example, a transmission step is typically carried out by a transmission module, a receiving step is carried out by a receiving module, a password generation step is carried out by a password generation module, etc. These modules are connected to one another so that a step carried out by one module can be followed by a step carried out by another module.

Figure 3:
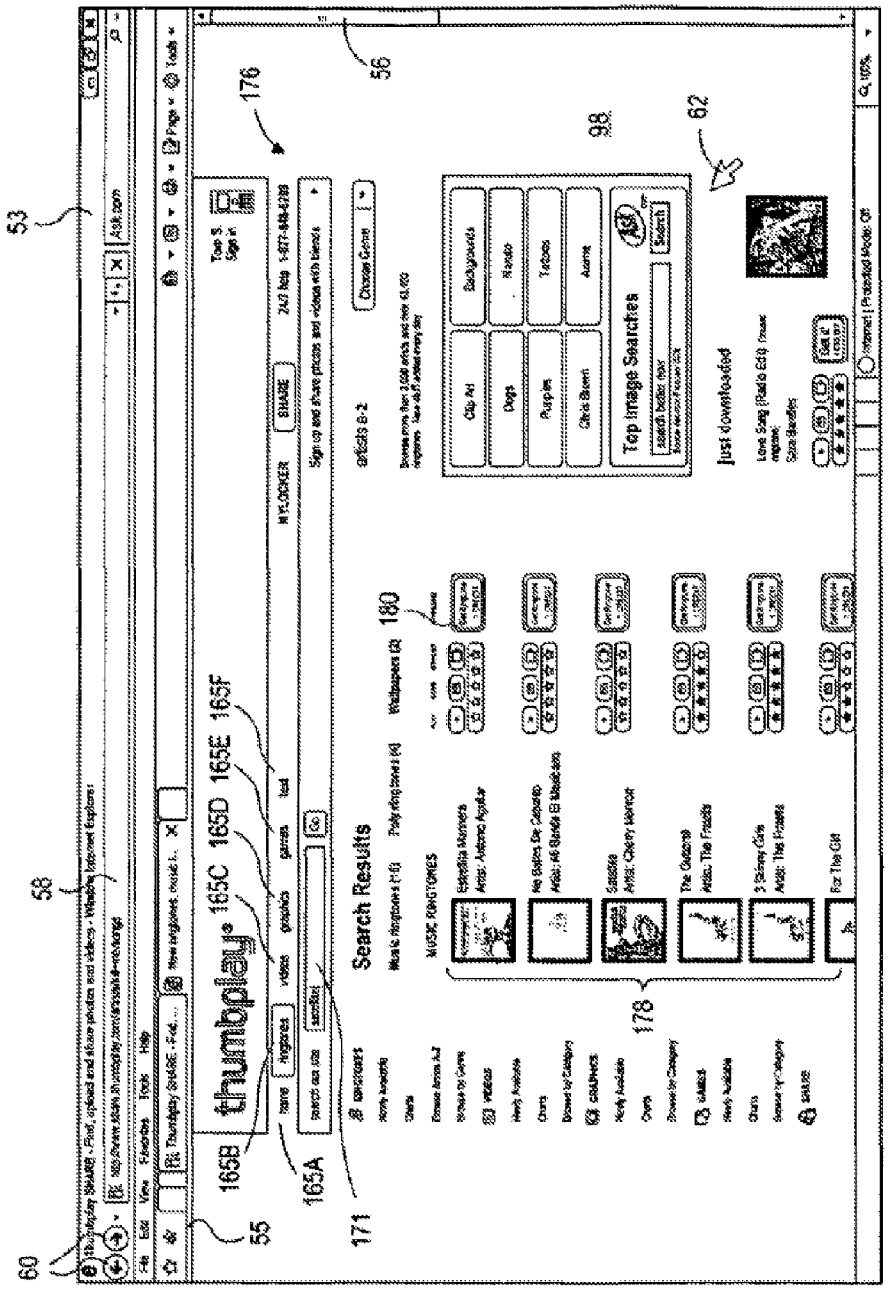
FIG. 3 is a view similar to FIG. 2, after a search has been conducted for media files in a database in FIG. 1.

FIG. 3 shows a view 176 that includes a download page with a plurality of search results 178 that are received at the user computer systems 24, 26, or 28 over the Internet 30 from the Web site 48. Each search result 178 includes a ringtone name, an artist name, and a ringtone download button 180, among other things.

Figure 4:
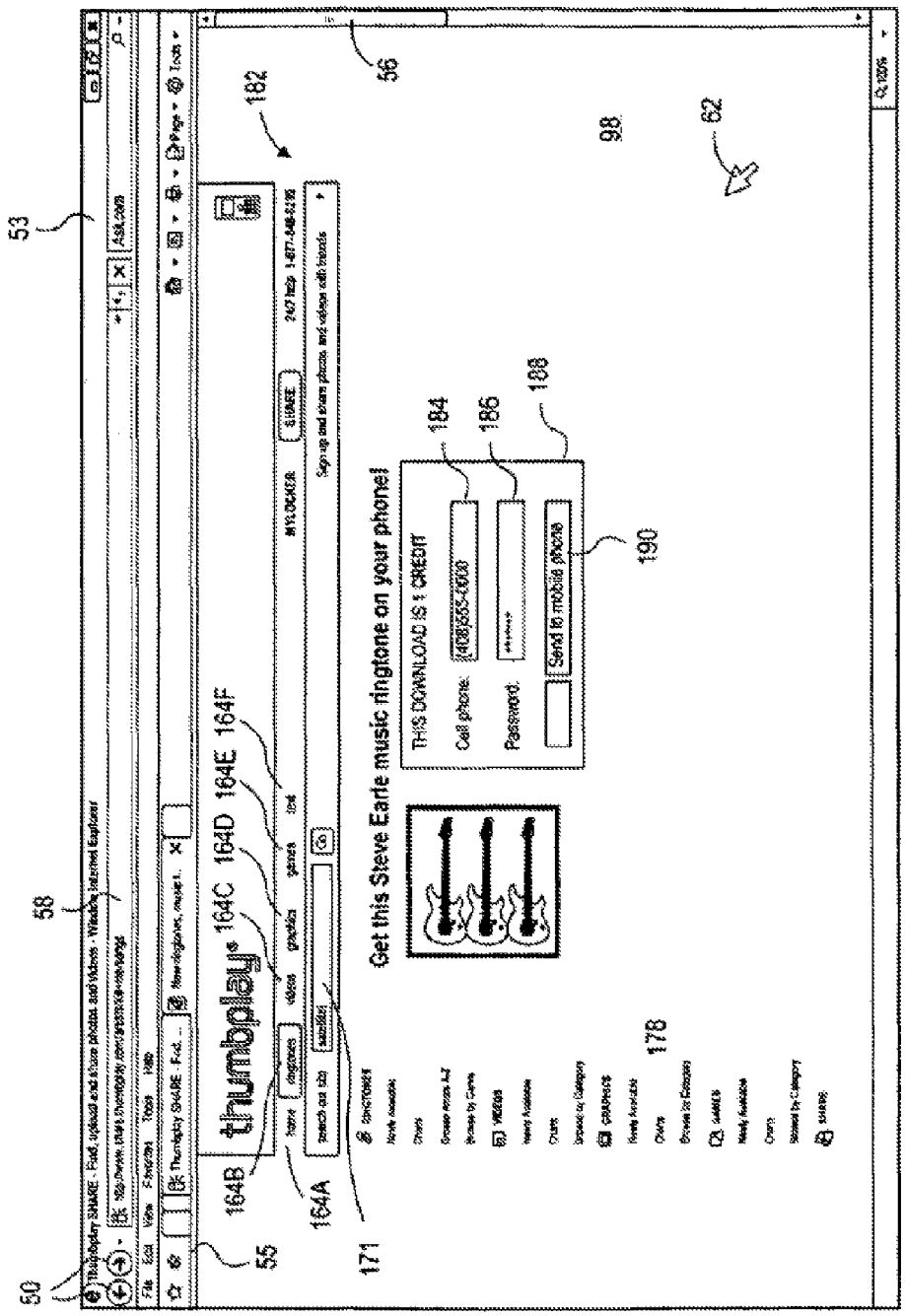
FIG. 4 is a view similar to FIG. 3, wherein registration and login information are completed and an instruction is sent to a server computer system to transmit a media file to a user mobile device.

FIG. 4 shows a view 182 that is displayed upon selection of one of the ringtone download buttons 180 in the view 176 of FIG. 3. A profile of the acquiring user computer system 24 is previously stored on the content delivery platform and content management system 46 of FIG. 1, including a mobile phone number 184 and a password 186. The view 182 includes the mobile phone number 184 and a password text box 188 for entering the password 186. The view 182 also has a "transmission" button 190. Upon selection of the "transmission" button 190, a signal is sent from the user computer system 24 over the Internet 30 to the Web site 48. The Web site 48 communicates with the content delivery platform and content management system 46, which uses the selected search result to access one of the ringtones on the media file server 42. The content delivery platform and content management system 46 then transmits a link corresponding to the accessed ringtone on the media file server 42 over the SMS/MMS network 40 to a user mobile device 32, 34, or 36 having the mobile phone number 184 in the view 182 of FIG. 4.

Figure 5:
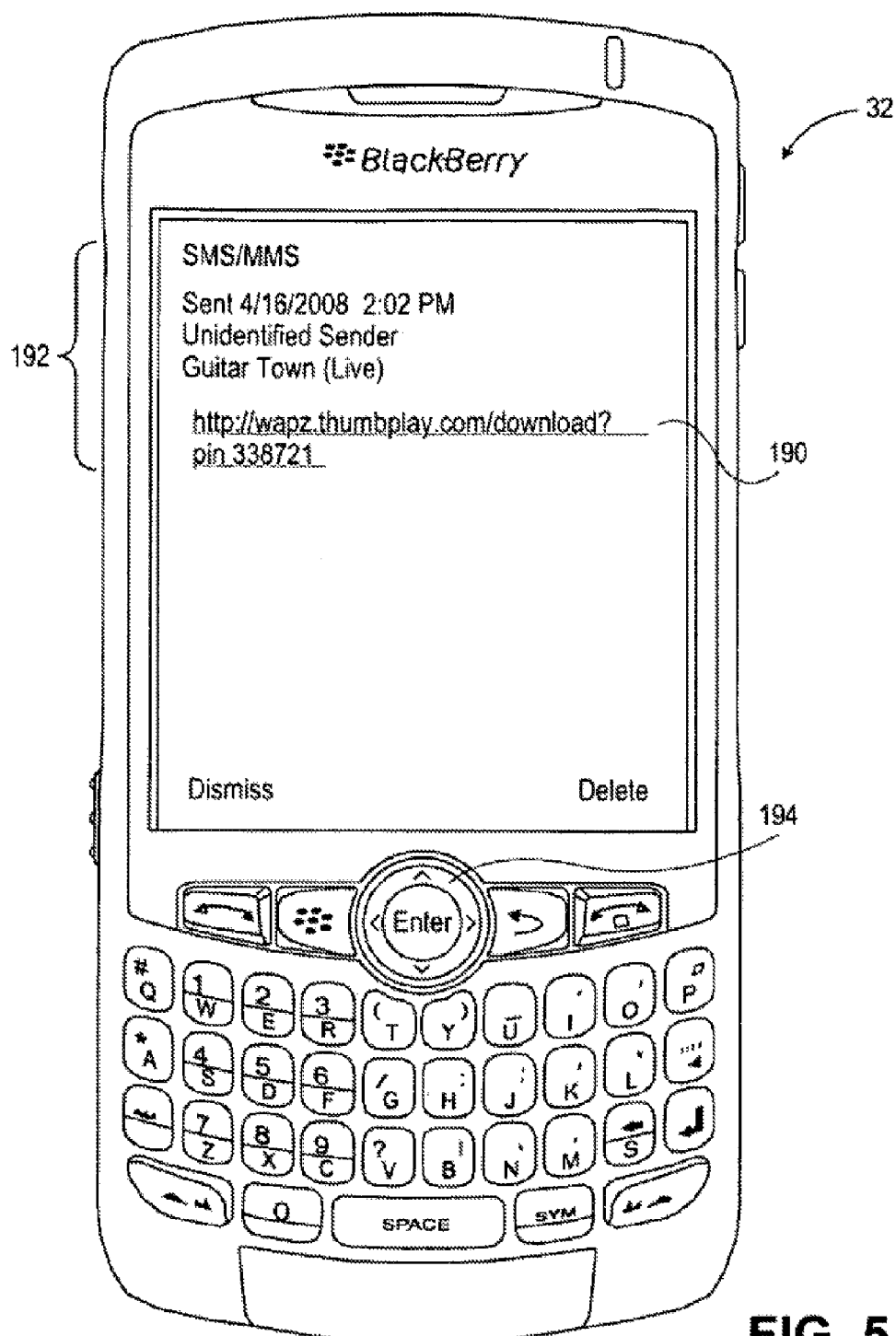
FIG. 5 is a front view of a user mobile device displaying an SMS message that is received by the user mobile device, the message including a link.

As shown in FIG. 5, the link 190 that is received at for example the user mobile device 32 comes in the form of an SMS message 192 that includes the link 190. An acquiring user can utilize "arrow" and "enter" keys 194 of the user mobile device 32 to select the link 190.

Figure 7:
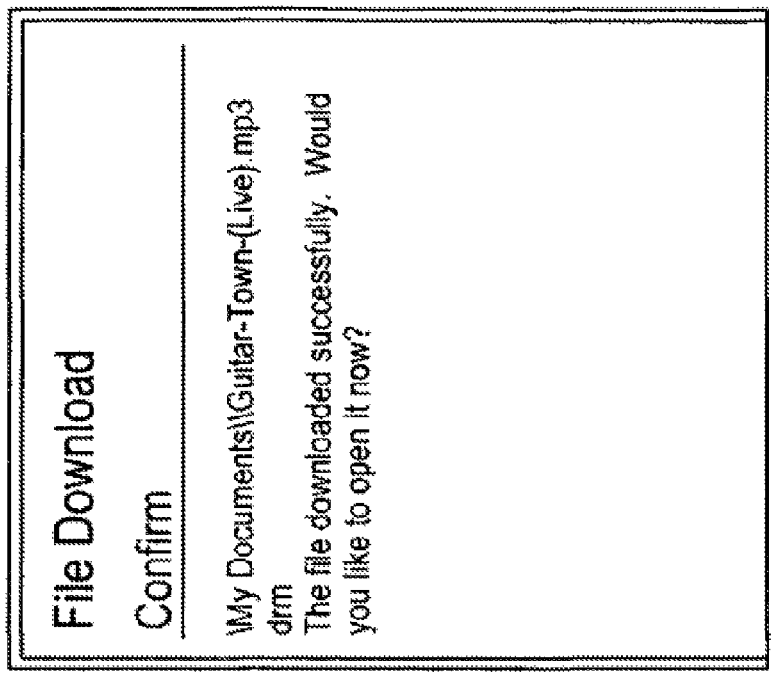
FIG. 7 is a view that is displayed on the user mobile device following successful downloading and saving of the media file.
Figure 6:
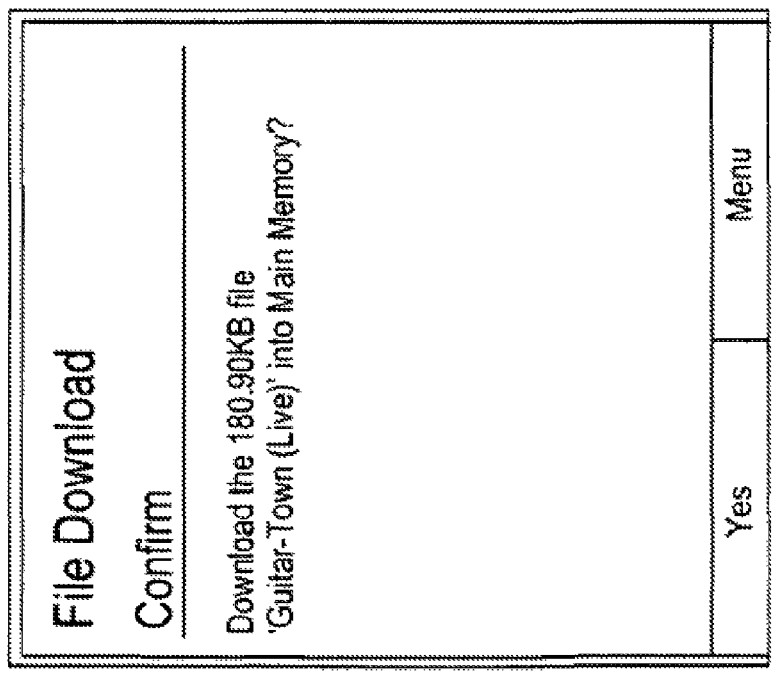
FIG. 6 displays a view on a WAP browser of the user mobile device to confirm downloading of a media file into memory of the user mobile device.

Upon selection of the link 190 and confirmation of the download as shown in FIG. 6, the user mobile device 32 transmits a requesting signal over the WAP network 38 in FIG. 1 to the content delivery platform and content management system 46. The content delivery platform and content management system 46 then automatically transmits a copy of the selected ringtone (or other media file) from the media file server 42 over the WAP network 38 to the respective user mobile device 32. The respective user mobile device 32 then automatically stores the copy of the selected ringtone in memory. As shown in FIG. 7, the user mobile device 32 then displays a message that confirms that the file has been downloaded and stored in memory of the user mobile device 32.

3. SMS with a Search Identifier

Figure 8:
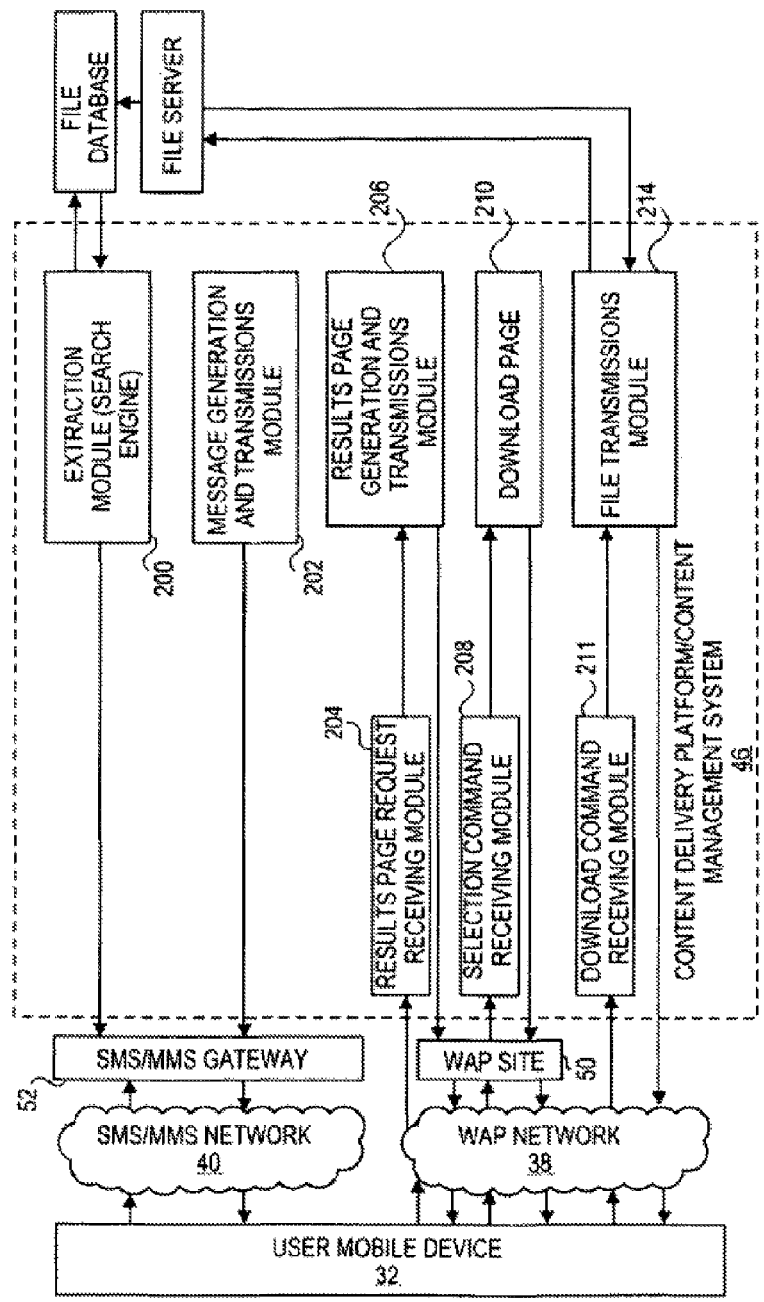
FIG. 8 is a block diagram illustrating components that are used primarily for processing a search request in a message from the user mobile device.

FIG. 8 illustrates components of the content delivery platform and content management system 46 that are used for responding to an SMS message with a search identifier "Get" that is received directly from for example the user mobile device 32 in FIG. 1. The components of the content delivery platform and content management system 46 shown in FIG. 8 provide a system that is different from and in addition to the system as hereinbefore described that utilizes the Website 48 in FIG. 1.

The content delivery platform and content management system 46 further includes a search engine, hereinafter referred to as an "extraction module" 200, a message generation and transmissions module 202, a results page request receiving module 204, a results page generation and transmissions module 206, a selection command receiving module 208, a download page 210, a download command receiving module 211 and a file transmissions module 214. The functioning of the system shown in FIG. 8 will now be described with reference to FIGS. 9 to 14 in conjunction with FIG. 8.

Figure 9:
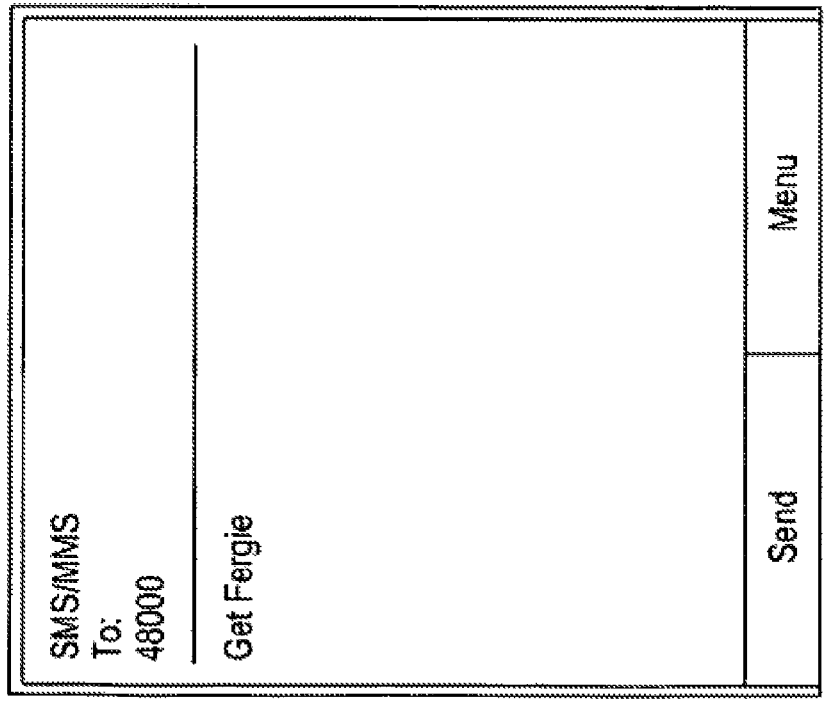
FIGS. 9 to 14 are views that are displayed on the user mobile device to illustrate the functioning of the system of FIG. 8.
Figure 10:
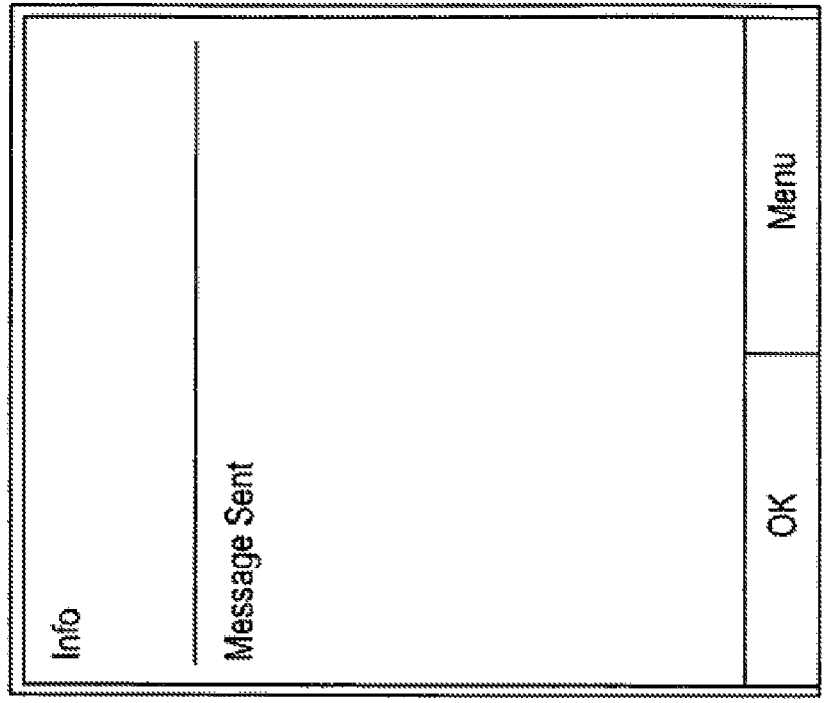

As shown in FIG. 9, the user of the user mobile device 32 prepares a message to an address 48000 with the text "Get Fergie" and then selects a "send" button to transmit the message. The message is transmitted from the user mobile device 32 over the SMS/MMS network 40 and is received by the SMS/MMS gateway 52. FIG. 10 shows a view that is displayed on the user mobile device 32 following transmission of the message.

SMS/MMS gateway 52 is connected to the extraction module 200. The extraction module 200 recognizes the text "Get" and the search query "Fergie" in the SMS message.

The text "Get" serves as a search identifier. Upon detection of the search identifier "Get" by the extraction module 200, the extraction module 200 thus determines that the message includes a search identifier and then utilizes the search query "Fergie" to extract a plurality of search results from the file database 44. In some embodiments, search results include a link to streaming content, including a radio station coupled to the content delivery platform and content management system 46. Search results can also include a user-created custom radio station that streams various content from various content sources, including file server 42 and other remote locations, including remote server computer systems and the like.

Figure 11:
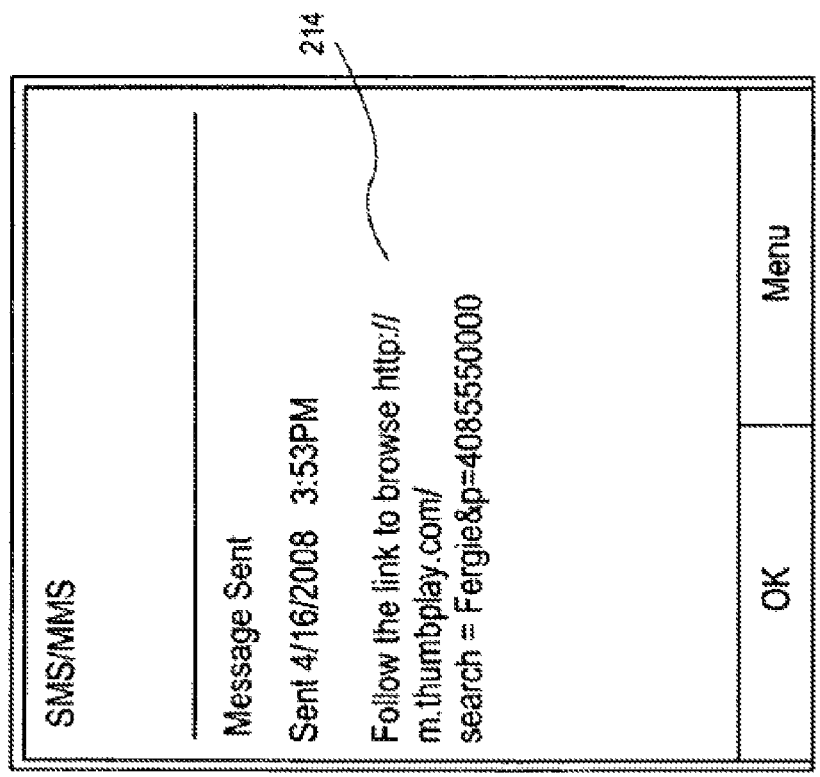

The message generation and transmissions module 202 is connected to the extraction module 200 and transmits a message through the SMS/MMS gateway 52 and the SMS/MMS network 40 to the user mobile device 32. If, as in the present example, the extraction module 200 has detected the search identifier "Get" in the SMS message of FIG. 9, the message that is transmitted by the message generation and transmissions module 202 as received by the user mobile device 32 and is shown in FIG. 11. The message includes a link 214 that can be selected by a user utilizing the "arrow" and "enter" keys 194 of the user mobile device 32 in FIG. 5. The link 214 includes the search request "Fergie" and a return address (the phone number) of the user mobile device 32. If, on the other hand, the search identifier "Get" was not present in the text, a message is sent to the mobile user device 32 with text stating that the message from the user mobile device 32 was in error.

4. WAP Site

Figure 12B:
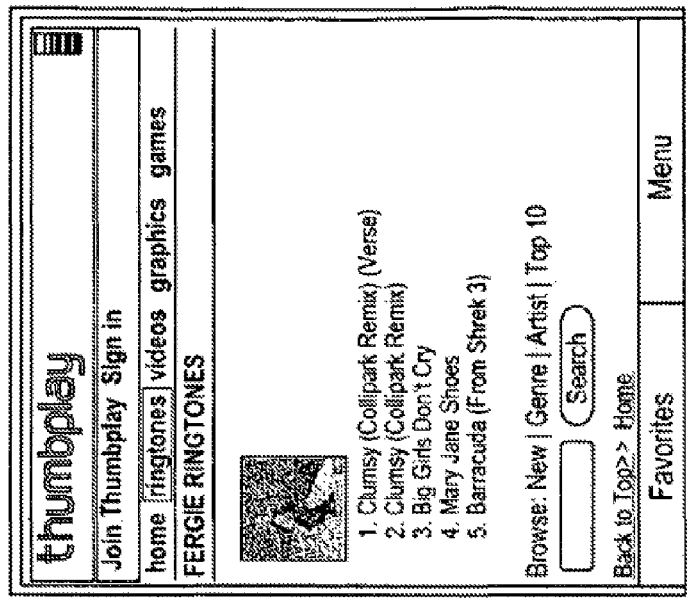
Figure 12A:
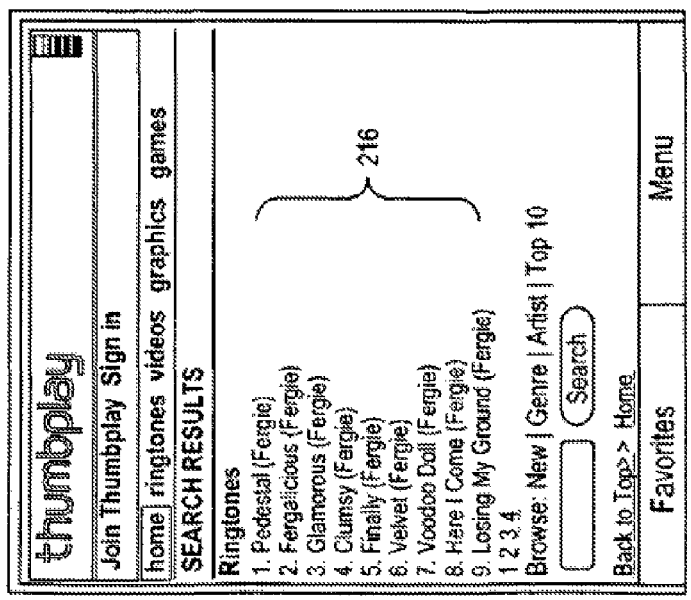

FIG. 12A shows a view of a WAP browser that automatically launches upon selection of the link 214 in FIG. 11. Upon selection of the link 214, a results page request command is transmitted by the user mobile device 32 over the WAP network 38 and is received by the results page request receiving module 204. The command includes the entire link 214. The results page generation and transmissions module 206 is connected to the results page request receiving module 204 and to the extraction module 200. The results page generation and transmissions module 206 generates a results page that includes the search results that are extracted by the extraction module 200 and transmits the results page via the WAP site 50 and the WAP network 38 to the user mobile device 32. FIG. 12A shows the results page and the search results 216 that are displayed by the WAP browser of the user mobile device 32.

FIG. 12B shows an alternative where a WAP browser is directed to an artist-specific page. An artist-specific page is displayed when a one-to-one match can be made between the search query and the artist-specific page. A track-specific page can be displayed when a one-to-one match can be made between the query and the track. A stream-specific page, including a page associated with a content stream associated with a radio station, can be displayed when a one-to-one match can be made between the query and one or more of the stream and the radio station. A results page such as in FIG. 12A is displayed when a one-to-one relationship cannot be made between the query and either an artist, a track, a stream, a radio station, and the like. The results page thus displays results from more than one artist or track.

Figure 13:
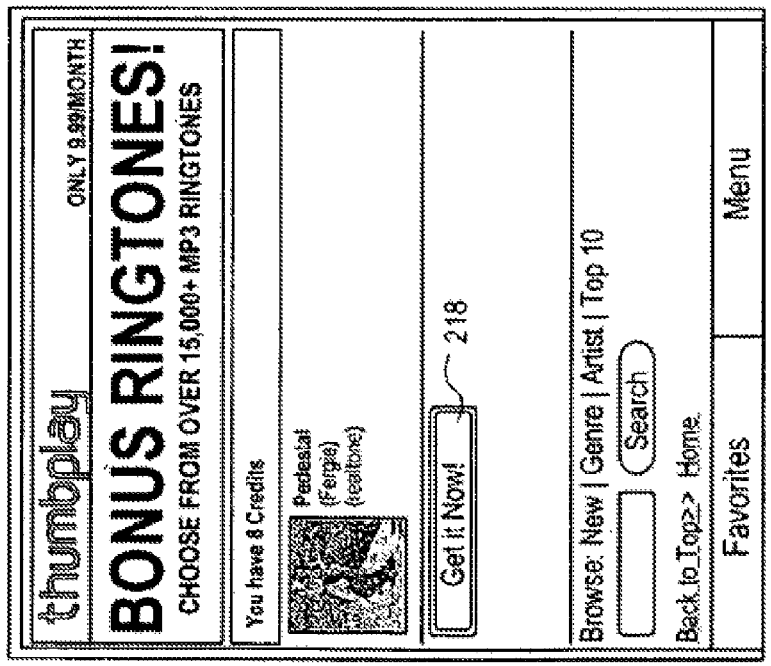

In the present example, the user selects the first search result "pedestal" to cause transmission of a selection command from the user mobile device 32 over the WAP network 38 and the WAP site 50. The selection command receiving module 208 is connected to the WAP site 50 and to the download page 210 so that the download page 210 is transmitted over the WAP site 50 and the WAP network 38 to the user mobile device 32. FIG. 13 shows a view of the download page 210 on the user mobile device 32. The download page 210 includes a "download" button 218. The buttons of the user mobile device 32 can be used to select the download button 218, which causes transmission of a download command from the user mobile device 32 over the WAP network 38.

Figure 14:
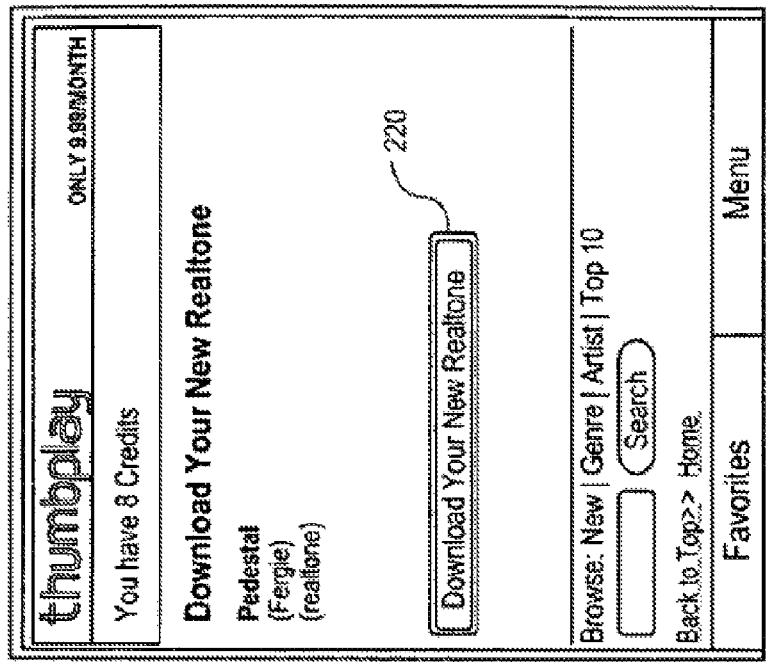

The download command receiving module 211 is connected to the WAP network 38 so as to receive the download command. The file transmissions module 212 is connected to the file server 42 and to the download command receiving module 211. The download command includes the name of the particular file in the file server 42, i.e., the file corresponding to the entry "pedestal" in the file database 44. The file transmissions module 214 utilizes the name of the entry in the download command to extract the corresponding file from the file server 42, and then transmits the file over the WAP network 38 to the user mobile device 32. FIG. 14 shows a view that is displayed on the user mobile device 32 to confirm downloading of the respective file. Upon selection of a confirmation button 220, the file is downloaded and saved in memory of the user mobile device 32 as hereinbefore described with reference to FIGS. 6 and 7.

In another example, the user selects the first search result "pedestal" to cause transmission of a selection command from the user mobile device 32 over the WAP network 38 and the WAP site 50. The selection command receiving module 208 is connected to the WAP site 50 and to a content access page so that the content access page is transmitted over the WAP site 50 and the WAP network 38 to the user mobile device 32. The content access page can include a link to content and an interface with which the user can interact to access the content, provide feedback and other actions regarding the content, and specify one or more of parameters and preferences regarding the content. For example, the interface can include a content player, including a media player application, which can play a content stream from a radio station to the user. The media player application can also play a content stream from a customer radio station to the user. The user can interact with the content access page to select a link, interact with the interface, or the like, which can cause transmission of an access command from the user mobile device 32 over the WAP network 38.

An access command receiving module, which can be part of the download command receiving module 211, can be connected to the WAP network 38 so as to receive the access command. A content transmissions module, which can be part of the file transmissions module 214, can be connected to the file server 42, various content sources, and to the download command receiving module 211. In some embodiments, the content transmissions module can transmit additional content, including applications, programs, and the like associated with various content. For example, the content transmissions module can transmit a token to one or more user mobile devices and user computer systems that tracks user actions and interactions with regard to various web sites, programs, content, and the like, including, without limitation, content transmitted by the content transmissions module. The access command includes the name of the particular content, i.e., the content corresponding to the entry "pedestal" in the file database 44. The content transmissions module utilizes the name of the entry in the access command to extract the corresponding content from corresponding one or more content sources, and then transmits the file over the WAP network 38 to the user mobile device 32. For example, where the access command includes a name of a particular custom radio station created by a user, the content transmissions module extracts parameters associated with the custom radio station from a storage location, such as file database 44, and provides content associated with the custom radio station from one or more various content sources, as directed by the parameters.

It can also been seen that the SMS messaging capabilities of the user mobile device 32 can be used to transmit a request for various content, including a media file, streaming content including a radio station, and the like. There is thus no need to utilize the WAP browser on the user mobile device 32 to search for and request a media file or to use a Web browser on a personal computer to search for and request a media file.

5. Registration and Login of User Computer

Figure 15:
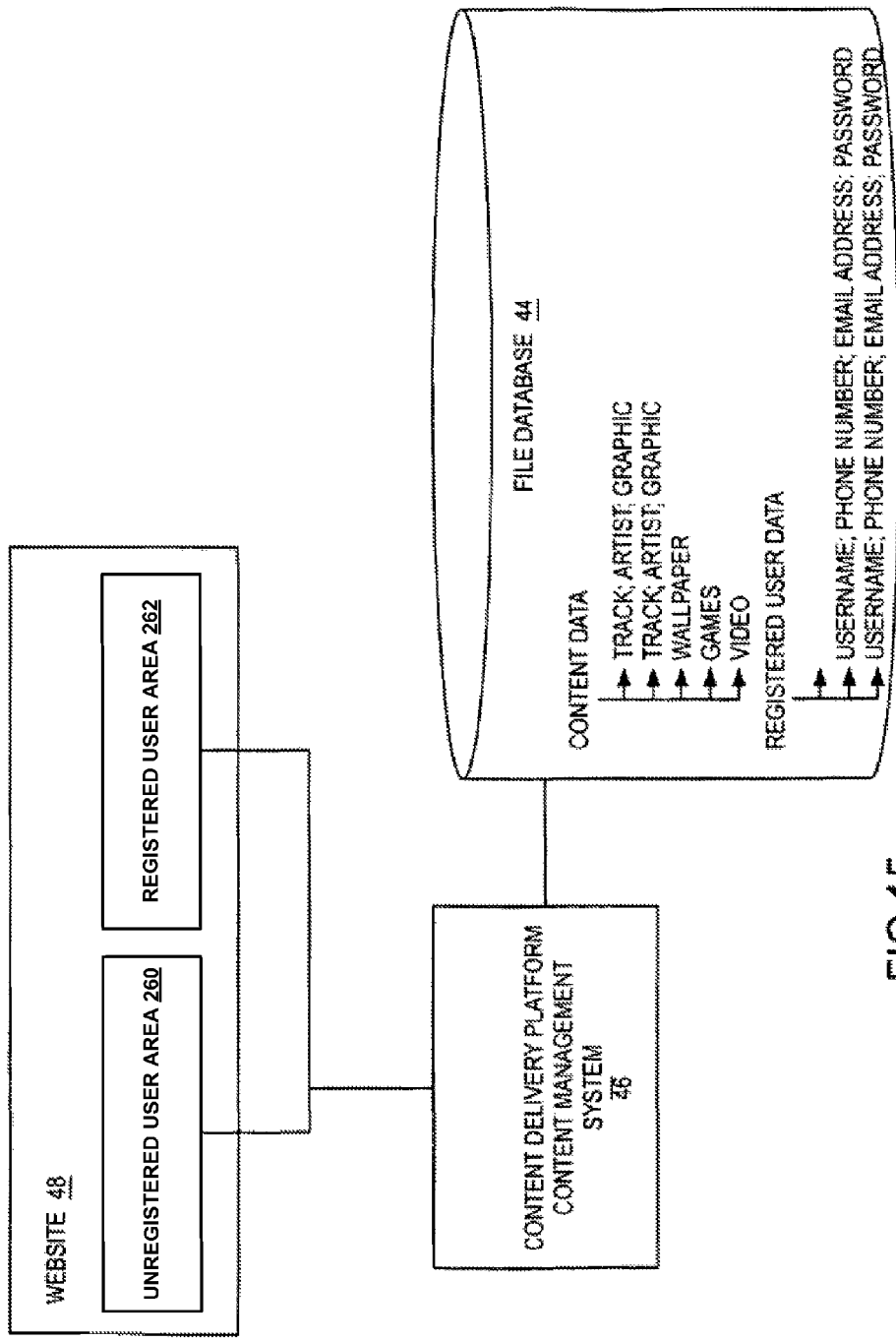
FIG. 15 is a block diagram of components of a server computer system in FIG. 1.

As shown in FIG. 15 the file database 44 includes content data and registered user data. The content data includes a plurality of tracks, each track having an associated artist and an associated graphic. Each track corresponds to a respective media file in the file database 44. In some embodiments, the content data includes one or more playlists of content, including links to streaming content provided by various content sources coupled to the server computer system 22. For example, content data can include a link to a playlist of streaming content from a radio station that is accessed at least in part from one or more remote server computer systems. The registered user data includes a plurality of user names, each with an associated phone number, email address and password. In some embodiments, the registered user data includes information associated with user interactions with various content. Interactions can include, without limitation, custom radio stations created by a registered user, specific content accessed by a registered user, custom content accessed by a registered user, feedback provided by a user regarding various content, actions taken by a user to skip plays of various content and repeat plays of various content, saves of one or more stations, user profiles and stations associated with the profiles, users associated with a registered user as "friends", publications of various interactions by a registered user to various sites, such as a Facebook timeline, and the like.

The Web site 48 includes an unregistered user area 260 and a registered user area 262. A user at one of the user computer systems 24, 26 or 28 in FIG. 1 can log onto the Web site 48 by entering login information or by automatically transmitting a cookie to the server computer system 22. The server computer system 22 compares the login information or the cookie with registered user data in the file database 44 and, upon a favorable comparison, provides the user computer system 24, 26 or 28 access to the registered user area 262. In the event of an unfavorable comparison or if login information or a cookie is not received at the server computer system 22, the respective user computer system 24, 26 or 28 is only provided access to the unregistered area 260. A user computer system 24, 26 or 28 that is provided only access to the unregistered user area 260 can still obtain access to the registered user area 262 following completion of a registration process. In some embodiments, a user at a user mobile device 32, 34, or 36, as illustrated in FIG. 1, can log onto the Web site 48 and be provided access to one or more of the unregistered user area 260 and the registered user area 262, as discussed above.

In some embodiments, an unregistered area 260 can provide a user with limited access to various functionalities associated with the web site 48. Such limited access can include access to some or all of functionality associated with web site 48 until a threshold is reached, upon which access is restricted to a reduced selection of some or none of the functionality. For example, a user computer system 24, 26, or 28 can be provided access to an unregistered user area 260 that provides some or all of the functionality of the registered user area until a threshold is reached, upon which the user computer system is restricted from accessing some or all of the functionality of the registered user area. A threshold can be determined by a combination of various factors including, without limitation, a predetermined period of time in which the web site 48 is accessed, a certain number of actions and interactions with functionality provided by the web site 48, and the like.

Thresholds can be stored locally to server computer system 22 and in remote locations, including a user computer system 24, 26, or 28 to which access to the unregistered area 260 is being provided. In some embodiments, thresholds are associated with a token, which can be a web cookie, that is provided to each user computer system that is provided access to the unregistered area 260. For example, where user computer system 24 is provided access to unregistered area 260, and unregistered area 260 provides access to at least some functionality otherwise provided via registered area 262 until a threshold is reached, the token can be downloaded to the user computer system 24. The token can monitor activity by a user associated with the user computer system 24 with regards to the web site 48 until the threshold is determined to be reached, based on the user's activity, including interactions with regard to the web site 48, at which time access can be partially or completely restricted. Users that are provided access to functionality through unregistered area 260 through user computer systems 24, 26, or 28 can be identified as anonymous users. In some embodiments, the number of anonymous users allowed per associated user computer systems 24, 26, or 28 can be restricted to a certain number. For example, the number of anonymous users per user computer system can be set at one for any given time, set at one for the lifetime of the user computer system, or the like. Such restrictions can be included and imposed by a token downloaded to a user computer system.

Thresholds can be configurable; for example, thresholds can be configured based on various functionalities provided by web site 48 by one or more authorized users and can be downloaded from server computer system 22. For example, in an embodiment where web site 48 provides access to various content streams from one or more radio stations, a threshold can be configured to be reached upon use of 3 custom radio stations, with 5 songs played per station and 10 interactions per station, where interactions can include skipping a play of a song, voting approval or disapproval of a song, and the like.

In some embodiments, the token downloaded to a user computer system can track and preserve history data associated with user interactions with regard to the web site 48 by a user during the period in which the user is provided access to at least some of the functionality provided by the registered user area 262. The history data can be stored as a local cache on the user computer system utilized by the user to perform the user's interactions. Upon restriction of such access based on a threshold being reached, if the user becomes a registered user, the history data can be provided to server computer system 22 to be stored in file database 44 as at least part of registered user data associated with the now-registered user. For example, where a user is provided access to registered user area functionality through the unregistered user area that includes the ability to create a custom radio station, and access to the custom radio station is restricted after a threshold is reached, the token can preserve data associated with the custom station and, in response to the user becoming a registered user, upload the data to server computer system 22 so that the user can resume access to the custom station as it was at the time the threshold was reached. Upon upload of the history data to the server computer system 22, the history data can be removed from the user computer system associated with the now-registered user by, for example, clearing the local cache.

In some embodiments, the token downloaded to a user computer system can track and preserve parameters and preferences specified by the user with regards to various features and content associated with web site 48. In some embodiments, the token can track and preserve history data associated with user interactions including feedback provided by the user with regards to various functionality of web site 48. Such data can be provided to various entities, including web services, in association with one or more web service calls. For example, the token can be passed as a parameter to a certain web service in association with a certain web service call to provide the web service with data associated with user-specified preferences and parameters, feedback, and the like associated with content provided by the web service, including playlists broadcast by a radio station and other various content items. Such passing of the token can occur as the user takes certain tracked interactions, at certain intervals, or the like.

The history data can be preserved at the user computer system associated with the user for a period of time after the threshold is reached. Alternatively or in addition, the history data can be preserved until one or more additional thresholds are reached, including the user declining to become a registered user upon the threshold being reached.

FIG. 15A illustrates a diagram 1500 of various interactions 1501 provided to various users based on registration of the user, with various associated parameters. As illustrated, certain interactions 1502 with content can be provided to both registered users and users granted temporary access to at least some functionality normally granted only to registered users. Such supported interactions can include, without limitation, creating a custom playlist of various content, such as a custom radio station, playing a custom song, providing feedback and other actions regarding content, including content provided by a custom radio station, including votes, ratings, skips, and repeats; and providing live feedback regarding provided content. In addition, as illustrated, certain interactions 1504 with content can be provided only to registered users, including users granted access to web site 48 through registered user area 260, as illustrated in FIG. 15. Such supported interactions can include, without limitation, saving a custom radio station created by the user, creating and accessing some or all of a user profile associated with the web site, including a view of stations associated with the profile, viewing and associating the user's profile with various users associated with one or more of the user's profile and other profiles of the user associated with other web sites, services, and networks, including social networking sites; and publishing information associated with the user's interactions with the web site on other sites and networks, such as publishing the user's interaction history with various content on a social networking site's news feed.

As illustrated in FIG. 15A, various supported interactions can contribute to a predetermined threshold which, when reached, can result in temporary access for an anonymous user accessing content through the unregistered area 262 of FIG. 15 to be restricted or disallowed. As shown in column 1508, a predetermined threshold can be reached through variable numbers of certain interactions. For example, as illustrated, a threshold can be reached after one or more of three custom radio stations are created, five custom songs are played from a given custom radio station, and ten actions associated with feedback, such as votes, and skips are taken by the user. In addition, some interactions can be free from contribution to a threshold, and can be performed without restriction by an anonymous user for the duration of the temporary access. For example, as illustrated, no threshold value is associated with providing feedback, such as a vote, regarding a live broadcast of content, including a live radio station stream of content. Some interactions, including feedback regarding live broadcast content, can be provided to various entities, such as content sources, in realtime or near-realtime, in addition to or in alternative to being preserved by the token in a local cache for uploading at a later time. As shown, interactions provided to registered users only are not associated with a threshold value, as such interactions 1504 are not provided on a temporary basis to anonymous users.

In some embodiments, access to various content and interactions varies based on the platform utilized by the user. As shown by column 1510, various interactions are provided to the user via one or both of a web platform or a mobile platform. For example, the interactions involving viewing one's profile and friends can be restricted to accessing functionality through a web platform. As shown by columns 1512 and 1514, various interactions can involve message ID's specific to the platform used.

Figure 16:
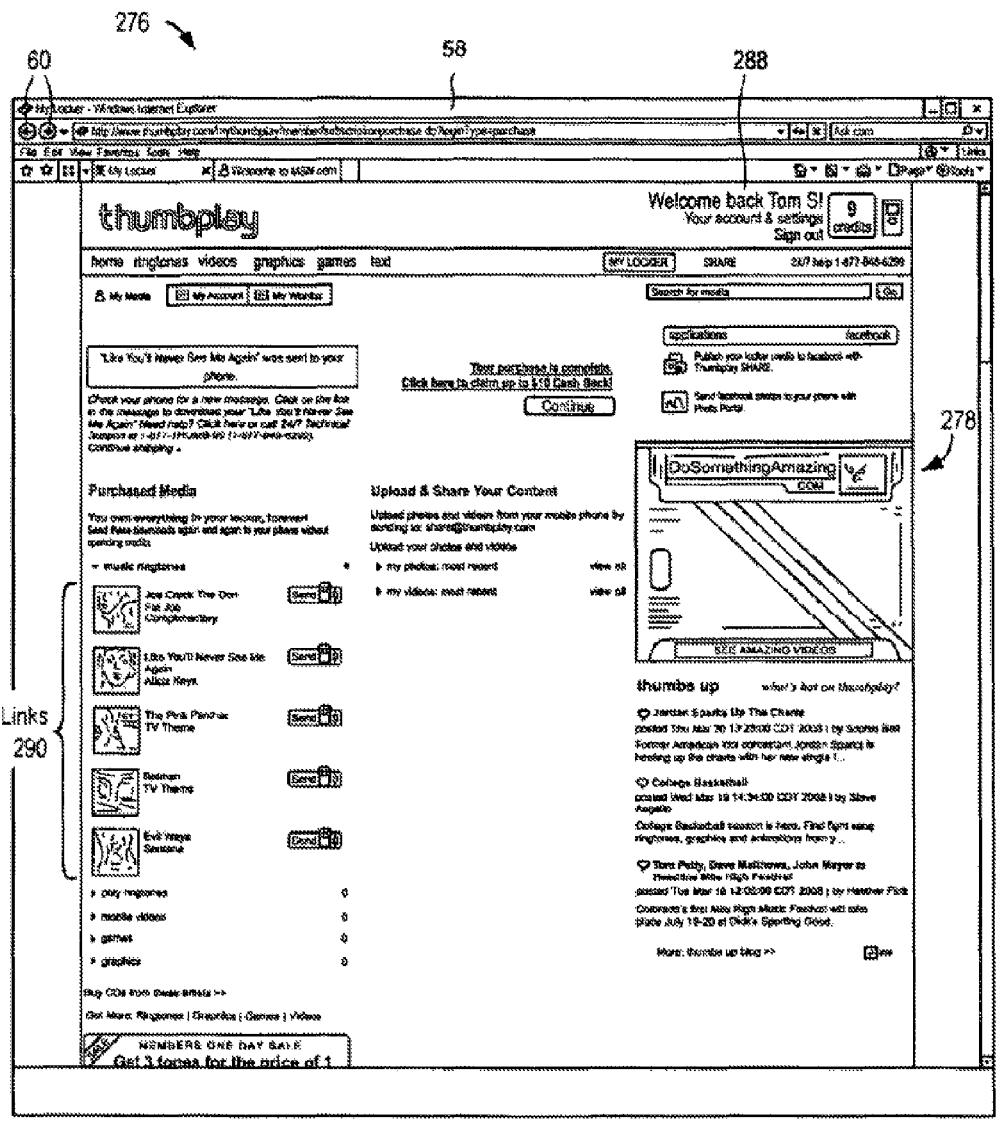
FIG. 16 is a screen shot of an Internet browser view displaying a user-specific homepage from a registered user area.

FIG. 16 illustrates a browser view 276 that displays a user-specific homepage 278 at the user computer system 24 in FIG. 1. Because the server computer system 22 has detected login information, the user-specific homepage 278 includes a username 288 from the file database 44 in FIG. 15 corresponding to the login information. The user-specific homepage 278 also includes links 290 from the file database 44 corresponding to media files that have previously been purchased by the specific user of the specific user computer system 24 and represented by the username 288. In some embodiments, links 290 can correspond to various content accessed by the specific user in the past and various content that is determined to be associated with other content accessed by the specific user. For example, one or more links 290 can correspond to a media player that provides a content stream from a radio station the specific user has listened to in the past, a media player that provides a custom content stream from a custom radio station that the specific user has created. A link 290 can correspond to a media player that provides a custom content stream from a custom station created by a user other than the specific user. For example, a link 290 can correspond to a custom radio station created by a another user that is associated with the specific user on a social networking site, such as a Facebook "friend." The user-specific homepage 278 also includes search and browsing functionality that allows the user of the user computer system 24 to search or find other media files for transmission to the user mobile device 32. Upon selection of such media files and instructions for downloading such media files, the media files will be transmitted to the user mobile device 32 without transmitting an intervening page from the server computer system 22 to the user computer system 24 requesting a phone number or login information such as a username or password.

Figure 17:
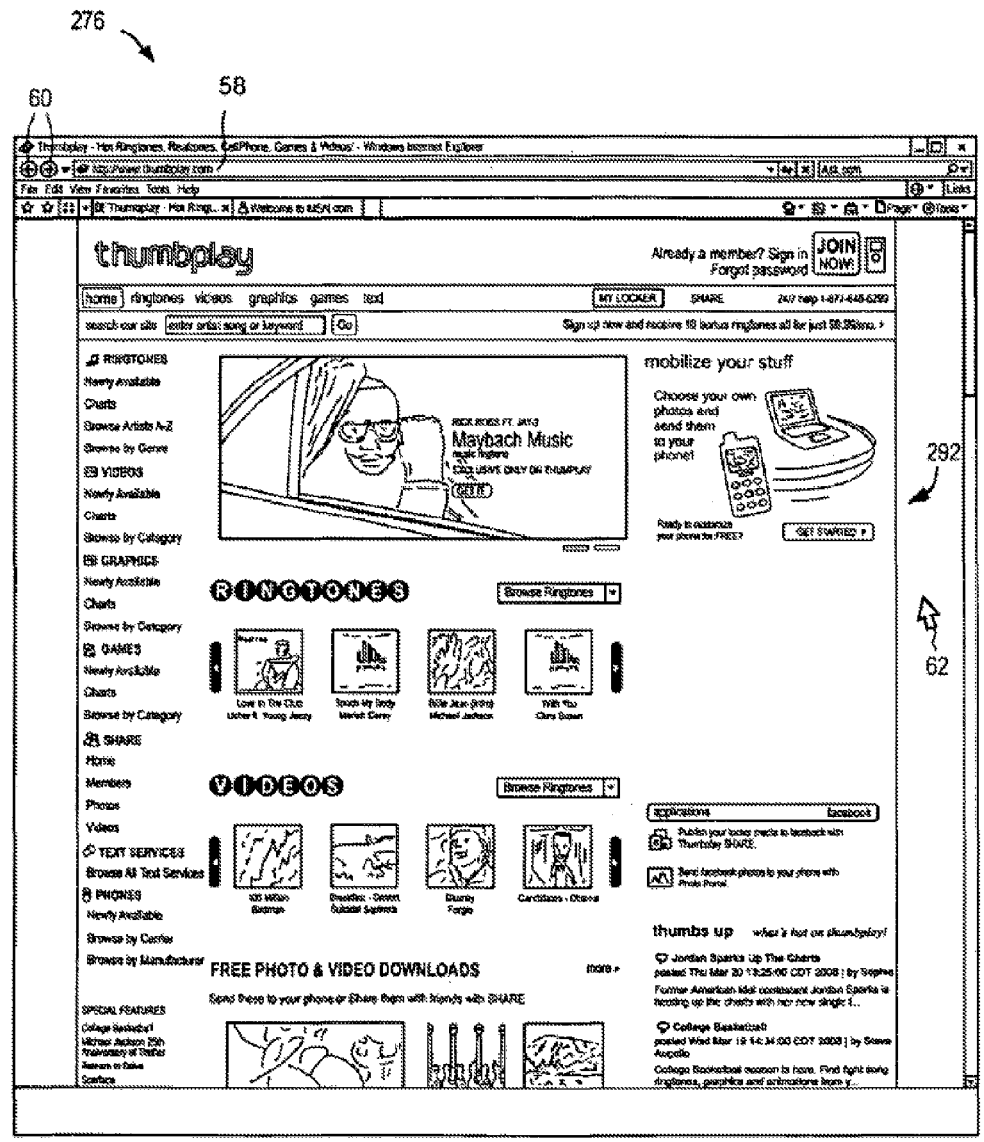
FIG. 17 is a view similar to FIG. 4 showing a general homepage from an unregistered user area.

FIG. 17 illustrates a general homepage 292 that is displayed at the user computer system 24 if a login is not detected. The general homepage 292 includes the same search and browse functionality as the user-specific homepage 278 in FIG. 16. However, the username 288 and links 290 in the user-specific homepage 278 of FIG. 16 are not displayed in the general homepage 292 of FIG. 17. A different user-specific homepage is transmitted to each user computer system from which login information is detected, but the same general homepage 292 of FIG. 17 is transmitted to all user computer systems from which login information is not received or cannot be validated. In some embodiments, the general homepage 292 provides limited access to various content based on a threshold, which can be associated with one or more of the content itself and the web site the homepage 292 is associated with. Access can include the being allowed to perform certain selected interactions with the various content, including specifying preferences and parameters, creating customized playlists and collections of content, providing feedback regarding certain content, and the like. Access can be restricted when a threshold is reached.

Figure 17A:
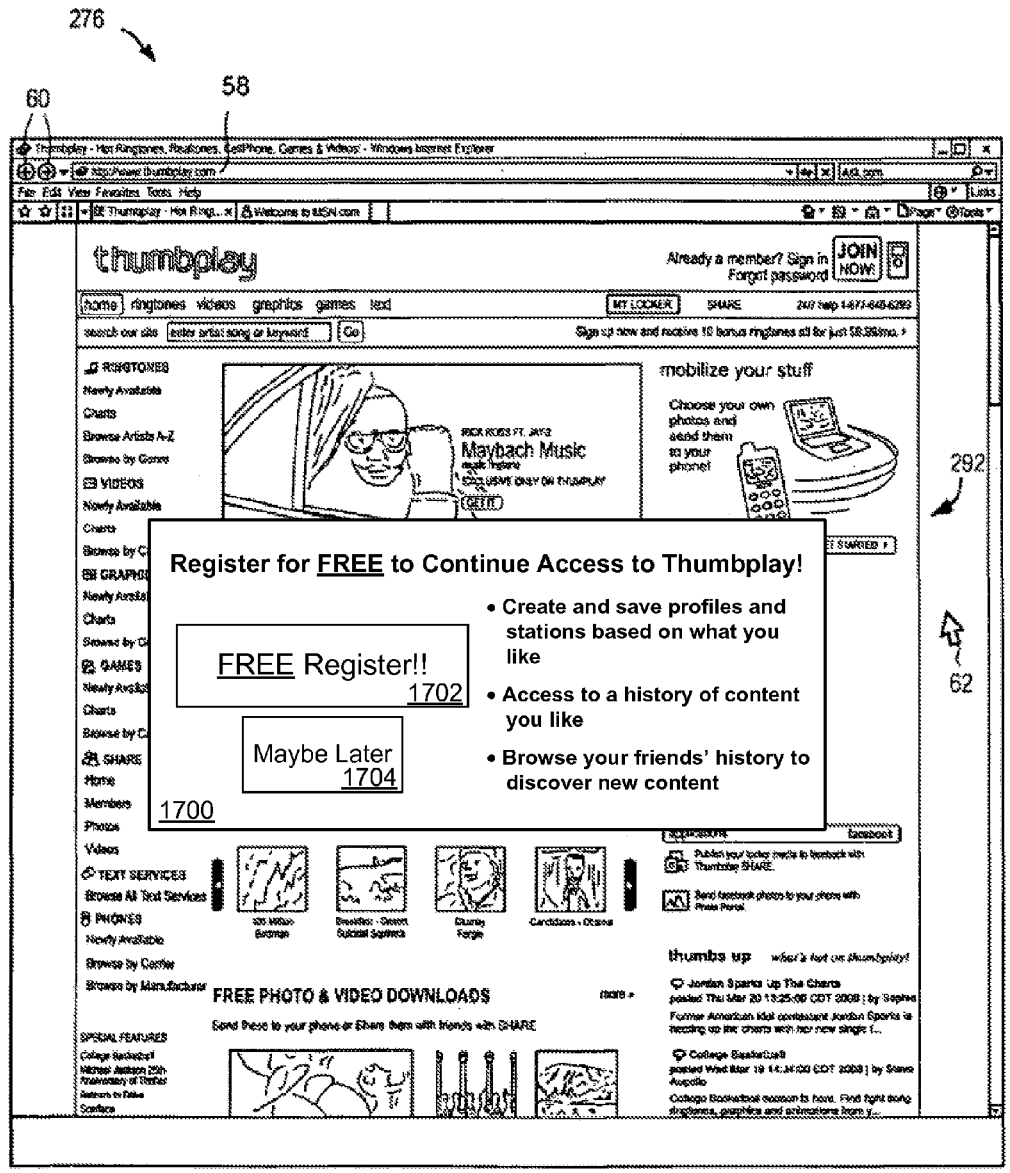
FIG. 17A is a view similar to FIG. 17 showing a general homepage from an unregistered user area with a roadblock.

FIG. 17A illustrates a roadblock 1700 that is displayed during use of the general homepage 292 displayed at the user computer system 24 if a login is not detected. In some embodiments, the general homepage 292 can provide a user with limited access to various functionality associated with the web site 48. Such limited access can include access to some or all of functionality associated with web site 48 until a threshold is reached, upon which access is restricted to a reduced selection of some or none of the functionality. In some embodiments, in response to the threshold being reached, a roadblock 1700 is displayed to the user, and interaction with some or all of general homepage 292 is restricted while the roadblock is displayed. As shown in FIG. 17A, the roadblock can be presented to overlay some or all of general homepage 292. For example, a user computer system 24, 26, or 28 can be provided access to an general homepage 292 that provides some or all of the functionality of the user-specific homepage of FIG. 16 until a threshold is reached, upon which the roadblock 1700 is presented and the user computer system is restricted from accessing some or all of the functionality of the general homepage 292.

In some embodiments, a roadblock 1700 includes functionality that enables a user to register for access to web site 48. A registration button 1702 can enable the user to register, while a declining button 1704 can enable a user to decline the offer to register. Additional messages, images, or the like displayed by the roadblock 1700 can inform the user of incentives and benefits of registration. Upon clicking the registration button 1702 and registering, the user can be provided access to the user-specific homepage illustrated in FIG. 16, while, upon clicking the declining button 1704, the user can continue accessing a restricted set of functionality provided by general homepage 292, exit from the web site 48, or the like.

In some embodiments, roadblocks are displayed based on a various prompts other than a threshold being reached. Roadblock can temporarily obstruct normal interaction with web site functionality by displaying a message with which a user can choose to interact further or dismiss. Roadblocks can be displayed based upon actions by a user. For example, a roadblock may be displayed in response to a user creating a custom radio station, playing one or more custom songs, or the like. Roadblocks can provide information specific to recent actions or behavior by the user, including actions triggering the roadblock. For example, a roadblock triggered by a user creating a custom station can include a message informing the user that he can register to save the custom station and access the custom station from a different device associated with the user. In another example, a roadblock triggered by a threshold being reached can reference various parameters associated with content recently accessed by the user, including artists, titles, and the like, to inform the user that registration can allow the user to access radio stations associated with such parameters. In another example, a roadblock can, if the user is currently logged into a social network, indicate to the user other users of the social network with whom the user is associated (e.g., Facebook "friends") that are also registered.

In some embodiments, a roadblock is provided to the user as an interstitial based on various triggers. For example, a roadblock can be displayed to the user as an interstitial upon first accessing a home page associated with the web site. The interstitial can be provided upon first accessing one or more services associated with the web site at certain or at certain intervals; for example, every fifth access of a certain link, service, or the like. In another example, where a user is accessing a stream of content associated with a radio station, an interstitial can be presented to the user after a certain number of content items are streamed to the user.

6. Automatic Login of Mobile Device

Figure 18:
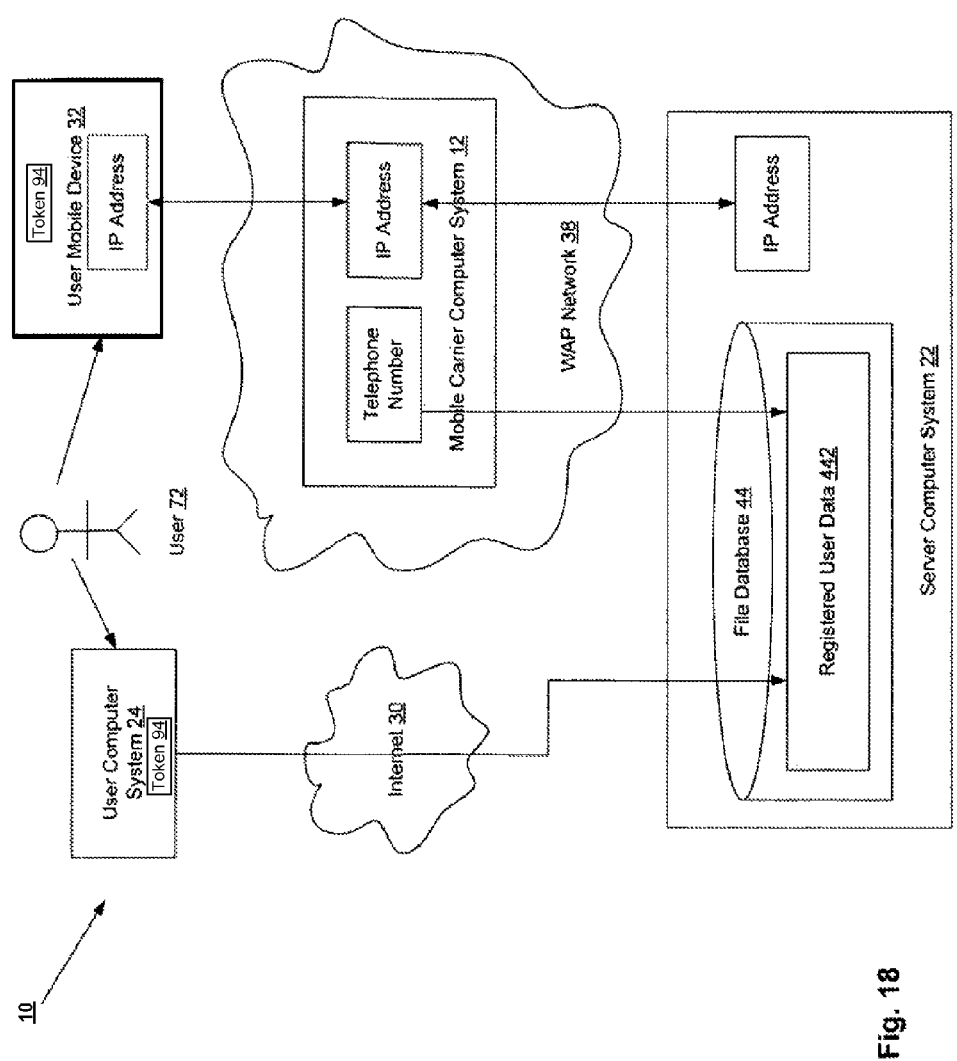
FIG. 18 illustrates a computer and network system that can be used for automatic login of mobile device.

FIG. 18 illustrates a computer and network system 10 that can be used for automatic login of mobile device. The computer and network system 10 includes the user computer system 24, the server computer system 22, the mobile carrier computer system 12, and the user mobile device 32. Although only one user computer system 24 and one user mobile device 32 are shown in FIG. 18, there may be a plurality of user computer systems and a plurality of user mobile devices in the computer and network system 10. The user computer system 24 is connected to the server computer system 22 over the Internet 30 or other forms of network. The server computer system 22 has a file database 44 for storing registered user data 442 and has memory for storing data such as an Internet Protocol (IP) address. The registered user data 442 includes username, password, phone number, and email address that is associated with a particular user 72. It also includes user-specific settings, for example, a user-specific homepage that is presented to the user 72 when the user is first logged into the server computer system 22.

The user mobile device 32 is connected to the server computer system 22 over the WAP network 38 which is maintained by the mobile carrier computer system 12. Both the user mobile device 32 and the mobile carrier computer system 12 have memories for storing IP addresses. In addition, the mobile carrier computer system 12 also has memory for storing unique identifier of the user mobile device, for example, a telephone number.

In use, the mobile carrier computer system 12 dynamically assigns an IP address to the user mobile device 32. Although the IP address assigned to the user mobile device 32 may stay the same for long periods of time, it can generally change. In contrast to static IP addresses which do not change, dynamic IP addresses have several advantages. They avoid the administrative burden of assigning specific static addresses to each user mobile device on a network. In some instances, they also allow many user mobile devices to share limited address space on a network when not all of them are online at the same time. In use, the mobile carrier computer system 12 keeps track of the unique identifier of a particular user mobile device, to which a particular dynamic IP address is assigned.

Figure 19:
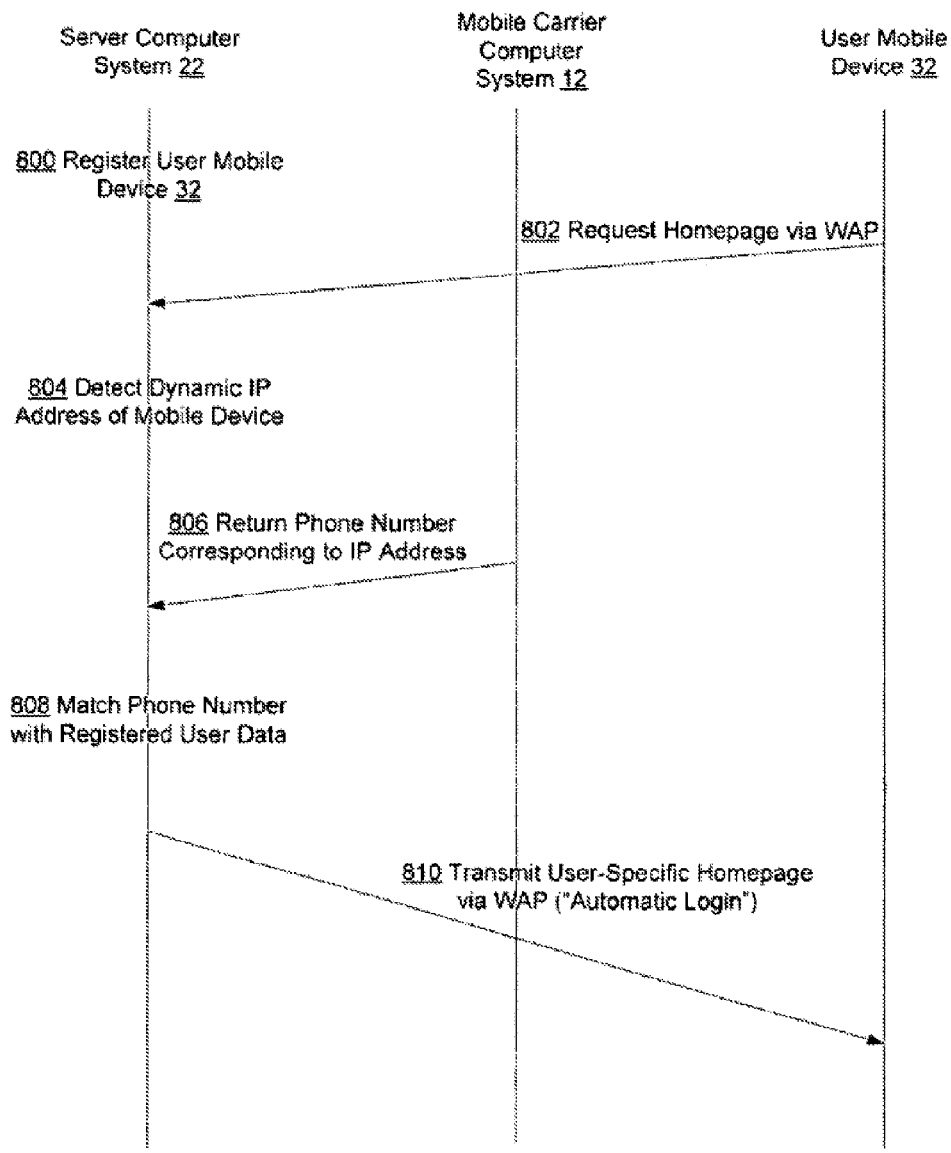
FIG. 19 illustrates signals that are transmitted between the server computer system, the carrier computer system, and the user mobile device.
Figure 19A:
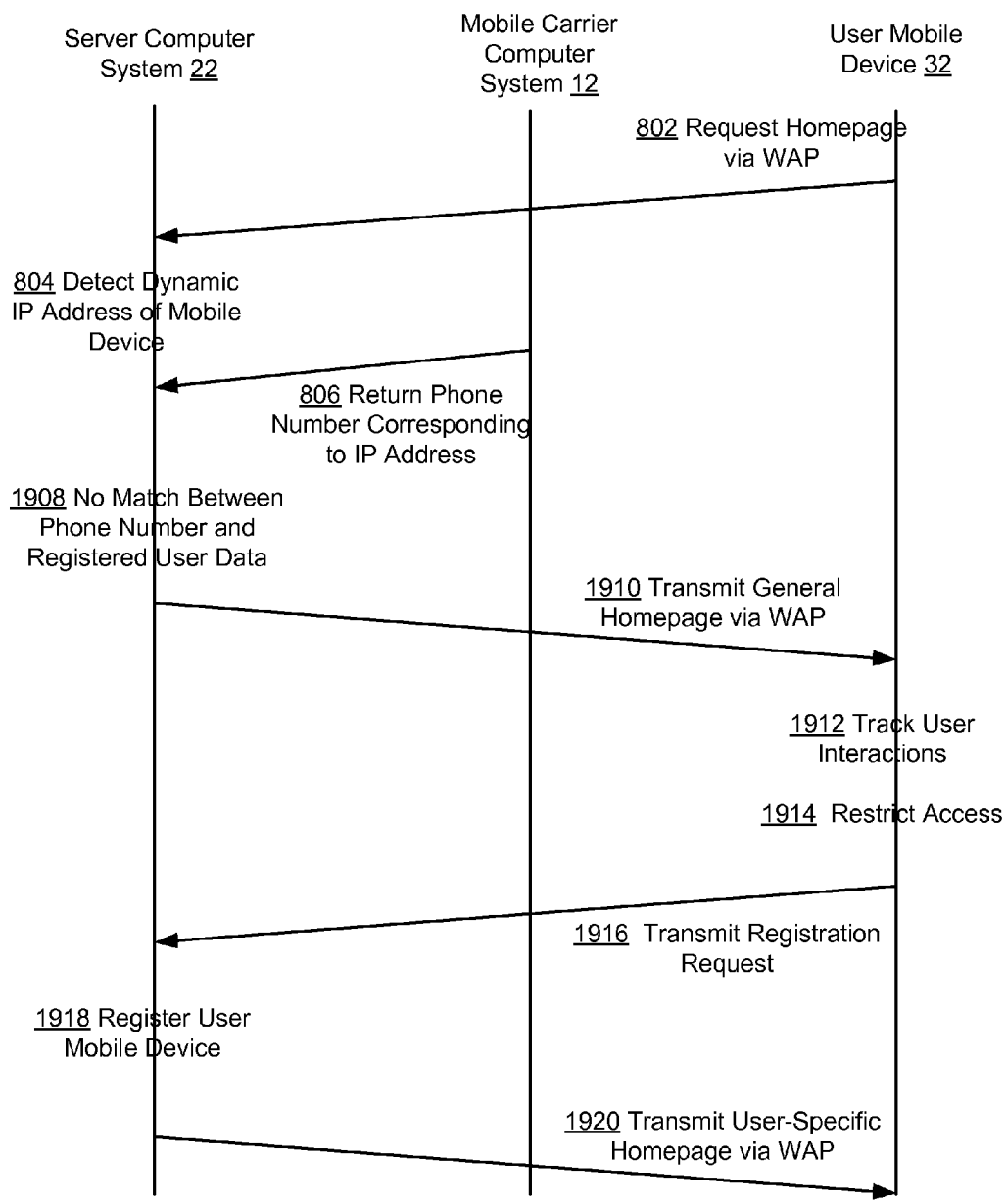
FIG. 19A illustrates signals that are transmitted between the server computer system, the carrier computer system, and the user mobile device.

In use, the user 72 has control of both the user computer system 24 and the user mobile device 32. FIG. 19 and FIG. 19A illustrate signals that are transmitted between the server computer system 22, the carrier computer system 12, and the user mobile device 32 in FIG. 1. At step 800, the user 72 may register both the user computer system 24 and the user mobile device 32 at the server computer system 22 using the user computer system 24. Details of the registration process are described in the last section. When the registration is completed, an entry is created in the registered user data 442 in FIG. 18 that includes the unique phone number of the user mobile device 32. A user-specific homepage associated with the user mobile device 32 is also saved in the registered user data 442.

At step 802, when the user 72 enters the URL "thumbplay.com" in the WAP browser on the user mobile device 32, the device sends a homepage request to the server computer system 22 via WAP network. At step 804, the server computer system 22 detects the IP address of the user mobile device 32 via the mobile carrier computer system 12. At step 806, the carrier computer system 12 sends to the server computer system 22 a phone number that corresponds to the IP address. At step 808, the server computer system 22 then compares the phone number with registered user data 442. As shown in FIG. 19, at step 810, upon a favorable comparison of the phone number, the server computer system 22 retrieves from registered user data 442 the user-specific homepage associated with the phone number, and sends the homepage to the user mobile device 32. In this way, the mobile device 32 is automatically logged onto the server computer system 22 without the need to transmit any login information such as user name and password.

Alternatively, the user 72 may send an SMS message with a homepage identifier "Homepage" to the server computer system 22. The server computer system 22 goes through steps 804, 806, and 808 above. Upon a favorable comparison of the phone number, the server computer system 22 sends an SMS message to the user mobile device 32 with a link to the user-specific homepage. When the user 72 selects the link, the WAP browser on the user mobile device will be launched with the user-specific homepage.

As shown in FIG. 19A, at step 1910, upon an unfavorable comparison of the phone number, the server computer system sends a general homepage to the user mobile device. The general homepage can be a generalized homepage that is not associated with any particular user, and can include reduced functionality in comparison to the user-specific homepage. In addition or in alternative, the general homepage can include limited access to some or all of the functionality provided by the user-specific homepage, where such functionality can be restricted based upon one or more thresholds being reached. As shown in FIG. 18, a token 94 can be provided to the user at one or more of the user mobile device 32 and user computer system 24. The token 94 can be sent concurrently or separately with the general homepage and, as shown in step 1912, can track activity by the user associated with the general homepage, including interactions with functionality provided by the homepage. For example, where the general homepage provides access to at least some functionality otherwise provided via the user-specific homepage until a threshold is reached, the token can be downloaded to the user mobile device. The token 94 can monitor interactions by the user with regards to the provided functionality, the general homepage, and the like until the threshold is determined to be reached, based on the user's interactions, at which time access can be partially or completely restricted, as shown in step 1914. In some embodiments, the token 94 can track and preserve history data associated with interactions and interactions by a user during the period in which the user is provided access to at least some of the functionality provided by the registered user area 262. The history data can be stored as a local cache on the user computer system utilized in the user's interactions. In some embodiments, the token can track and preserve history data from a device remote from the device utilized in the user's interactions with the web site; for example, the user's interactions and activities can be tracked from the server computer system 22.

Upon restriction of such access based on a threshold being reached, as shown in step 1914, the user can be presented with a roadblock, illustrated and discussed above with reference to FIG. 17A. The roadblock can inform the user of the restriction of access and offer the user an opportunity to resume access via registration. If the user agrees to register, a registration request can be sent to the server computer system 22, as shown in step 1916. In response, the user is registered at 1918, which can include registering one or more of the user's mobile device and user computer system. Details of the registration process are described in the last section. The user can then be provided access to the user-specific homepage, as shown in step 1920. In addition, if the user becomes a registered user, the history data preserved by the token 94 can be provided to server computer system 22, concurrently or separately with the registration request 1916, to be stored in file database 44 as at least part of registered user data associated with the now-registered user. The history data can be incorporated into the user-specific homepage. For example, where a user is provided access to registered user area functionality through the unregistered user area that includes the ability to create a custom radio station, and access to the custom radio station is restricted after a threshold is reached, the token can preserve data associated with the custom station and, in response to the user becoming a registered user, upload the data to server computer system 22 and provide a user-specific homepage that includes access to the custom station so that the user can resume access to the custom station as it was at the time the threshold was reached.

In some embodiments, data associated with anonymous interactions with functionalities provided through the general homepage can be reported. Interactions can be reported to various entities in realtime or near-realtime, at various intervals, intermittently, or the like. For example, where an unregistered, or anonymous, user provides feedback for a live broadcast of content access through the general homepage, the feedback can be reported immediately to various entities, including the source of the broadcast content, the server computer system, or the like. Some interactions can be reported upon registration of the anonymous user, or upon one or more other events. Reporting can involve web service calls associated with the token tracking and preserving data associated with user interactions. Relationships between various web service calls associated with the anonymous token and various elements including, without limitation, total listening hours (TLH), can be reported. Reported interactions can be grouped by specific types of interactions. For example, where a provided functionality includes allowing a user to create a custom radio station, interactions associated with creation of custom radio stations by anonymous users, such as quantity and frequency of creations on a per-user or total basis, can be reported. Performance of one or more functionalities, including access to various content and interactions with various content, provided to one or more of anonymous and registered users can be reported including, without limitation, creation of custom content playlists and the like; playing of songs from the custom content playlists; feedback regarding the songs, skips, repeats, and other actions regarding content played; and feedback regarding live streaming content, such as live radio station song votes. In addition, the number of roadblock presentations, interactions with roadblocks, and conversion of users from anonymous to registered can be tracked and reported as conversion performance, and such conversion can be compared with use of various provided functionalities to enable evaluation of the various provided functionalities with regards to user registration. Such reports can be utilized to augment provided functionalities to improve conversion performance, improve marketing strategies, and the like.

7. Computer System

Figure 20:
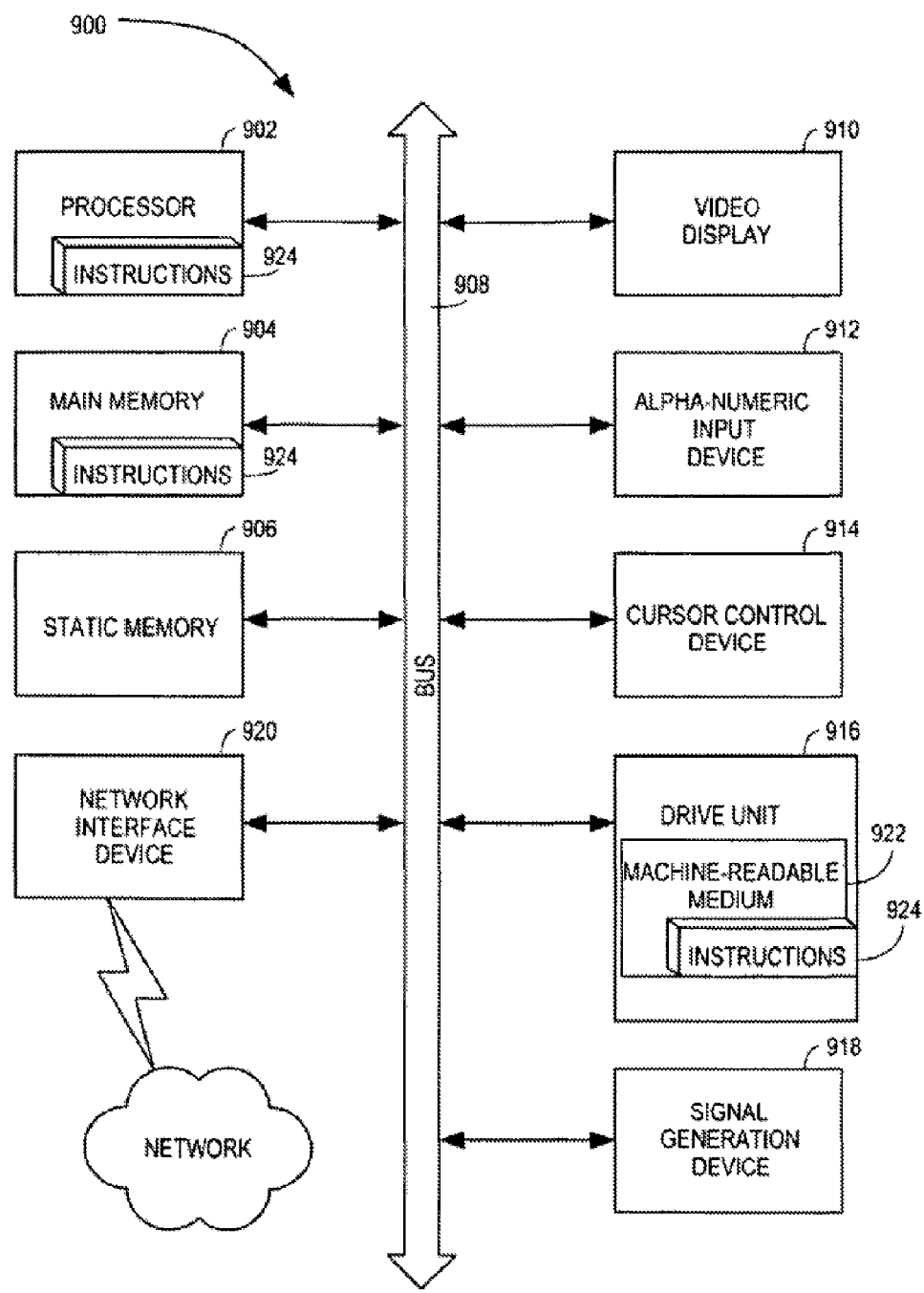
FIG. 20 is a block diagram of components of a server computer system in FIG. 1.

FIG. 20 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A server computer system comprising:
a memory and processor coupled to the memory;
a computer program stored in the memory and executable by the processor, the computer program including:
a first module configured to, deliver different homepages to a user associated with a user mobile device in response to receiving a request for a homepage from the user associated with the user mobile device, wherein the request for the homepage does not differentiate between user-specific and general homepages, and wherein delivering different homepages includes:
providing, to registered users associated with the user mobile device, a user-specific homepage customized for individual registered users, the user-specific homepage including first functionality of a website not available via a general homepage on an unrestricted basis, wherein the first functionality includes customization of a media station;
providing, to an unregistered user of the user mobile device, via the general homepage, access to the first functionality via the general homepage, the access to the first functionality being limited based on a user reaching a user interaction threshold;
a transmission module configured to transmit a token to the user mobile device, the token configured to:
track historical unregistered interaction data at the user mobile device, wherein the historical unregistered interaction data represents interactions with the first functionality occurring at the user mobile device prior to the user of the user mobile device being registered;
store customization data related to the first functionality;
a second module configured to report the historical unregistered interaction data to at least one web service associated with providing the first functionality, the historical unregistered interaction data preserved until one or more additional user interaction thresholds are reached;
the second module further configured to respond to registration of the user of the user mobile device with the server computer system by:
reporting the historical unregistered interaction data with the first functionality as registered interaction data to the at least one web service;
receiving the customization data stored by the token; and
incorporating the customization data into the user-specific homepage.

2. The server computer system of claim 1, the second module further configured to:
provide feedback from a user supported by the user mobile device with regard to the first functionality as the historical unregistered interaction data to the at least one web service; and
respond to registration of the user of the user mobile device by providing preferences specified by the user with regard to the first functionality as registered interaction data to the at least one web service.

3. The server computer system of claim 1, the access is disallowed in response to a determination that the user interaction threshold is reached, the user interaction threshold corresponds to a maximum of one or more allowed interactions by the user mobile device with a plurality of media files.

4. The server computer system of claim 1, the token is further configured to determine whether the user interaction threshold is reached based on the historical unregistered interaction data generated by the token.

5. The server computer system of claim 1, the transmission module further configured to transmit a roadblock message disallowing the access provided to the user mobile device in response to a determination that the user interaction threshold is reached.

6. The server computer system of claim 1, the second module further configured to respond to registration of the user of the user mobile device of the server computer system by storing the user-specific homepage as registered user data.

7. The server computer system of claim 1, wherein the second module is further configured to:
clear at least a portion of the historical unregistered interaction data from storage on the user mobile device in response to the historical unregistered interaction data being reported to the at least one web service as registered interaction data.

8. A non-transitory computer-readable storage medium having stored thereon a set of instructions which, when executed by a processor of a computer carries out a method comprising:
delivering a general homepage to a device associated with a user in response to a homepage request specifying a first network address;
storing, in a token transmitted to the device associated with the user, historical unregistered interaction data associated with interactions by an unregistered user with content provided in association with a web service through a general homepage providing limited access to functionality otherwise fully available through a user-specific homepage, the interactions limited based on receiving an indication that the unregistered user reaches a user interaction threshold and the historical unregistered interaction data preserved in the token, at least until one or more additional user interaction thresholds are reached, and wherein the functionality includes selection of the content for inclusion in a customized media station;
storing, in the token transmitted to the device, user customization data related to customization of the customized media station;
providing a first portion of the historical unregistered interaction data to the web service in association with a web service call;
in response to registration of the user with the web service:

receiving the customization data and the historical unregistered interaction data stored in the token;

uploading a second portion of the historical unregistered interaction data to a server computer system as registered user data associated with the user;

incorporating the customization data and the historical unregistered interaction data into a user-specific homepage; and delivering the user-specific homepage to the device associated with the user in response to a subsequent homepage request specifying the first network address.

9. The non-transitory computer-readable storage medium of claim 8, the method further comprising:

in response to determining that cumulative interactions by the unregistered user with the content meets a predetermined one of the one or more additional user interaction thresholds, disallowing access by the unregistered user to the content.

10. The non-transitory computer-readable storage medium of claim 9, the method further comprising:

in response to determining that cumulative interactions by the unregistered user with the content meets the predetermined one of the one or more additional user interaction thresholds, displaying a roadblock message to the unregistered user that allows the unregistered user to overcome the disallowing via user registration on the server computer system.

11. The non-transitory computer-readable storage medium of claim 9, the method further comprising:

in response to registration of the unregistered user with the web service subsequent to the disallowing, providing restored access by the user to the content.

12. The non-transitory computer-readable storage medium of claim 11, the method further comprising:

storing at least the second portion of the historical unregistered interaction data in a local cache of a user device supporting the unregistered user; and in response to registration of the user with the web service subsequent to the disallowing, uploading the second portion of the historical unregistered interaction data from the local cache to a file database supported by the server computer system as registered user data and deleting the local cache.

13. The non-transitory computer-readable storage medium of claim 11, wherein:

the interactions by an unregistered user include access to a plurality of content items;

the first portion of the historical unregistered interaction data includes user-specified feedback associated with at least one of the plurality of content items;

the second portion of the historical unregistered interaction data includes user-specified parameters associated with a user-customized plurality of content items; and the restored access includes restored access to the functionality based on the user-specified parameters.

14. A computer-based method comprising:

transmitting to a user computer system associated with a user, in response to a webpage request specifying a first network address, an unregistered user page associated with an unregistered user area of a web site supported by a server computer system;

transmitting a token to the user computer system, the token configured to store:

user interaction data with regard to first functionality that would otherwise be fully available through a user-specific page associated with a registered user area of the web site, and to store customization data related to the first functionality, and wherein the first functionality includes customization of a media station;

receiving interaction data associated with interactions by the user with regards to the first functionality until at least one user interaction threshold is met, wherein the interaction data includes a historical record of a plurality of interactions with the first functionality through the unregistered user area of the web site;

in response to a registration of the user as a registered user on the server computer system:

receiving the customization data related to the first functionality and the user interaction data stored in the token;

saving the interaction data as registered user data associated with the registered user;

incorporating the interaction data and the customization data related to the first functionality into the user-specific page; and delivering the user-specific page to the user computer system in response to a subsequent webpage request specifying the first network address.

15. The computer-based method of claim 14, providing access based on user interactions with regards to the first functionality includes responding to a determination that cumulative interactions of the user meet a threshold of cumulative user interactions by disallowing the user computer system from further access with regards to the first functionality.

16. The computer-based method of claim 15, comprising responding to registration of the user subsequent to the disallowing by uploading interaction data from a local cache on the user computer system to a file database supported by the server computer system as registered user data.

17. The computer-based method of claim 15, comprising responding to registration of the user subsequent to the disallowing by providing restored access by the user computer system with regards to the first functionality of a web site.

18. The computer-based method of claim 17, wherein:

the first functionality includes access to a plurality of content items;

the interaction data includes user-specified parameters associated with a user-customized plurality of content items; and the restored access includes restored access to the first functionality based on the user-specified parameters.

19. The computer-based method of claim 18, providing restored access by the user computer system with regards to the first functionality of a web site based on the registered user data includes providing the user-customized plurality of content items based on the interaction data stored as registered user data.

20. The computer-based method of claim 15, providing access based on user interactions with regards to the first functionality further includes responding to a determination that the cumulative interactions of the user meet the threshold of cumulative user interactions by providing a roadblock message to the user computer system that allows the user to overcome the disallowing via user registration on the server computer system.

* * * * *